United States Patent
Joo et al.

(10) Patent No.: US 9,816,206 B2
(45) Date of Patent: *Nov. 14, 2017

(54) CARBONACEOUS METAL/CERAMIC NANOFIBERS

(71) Applicant: CORNELL UNIVERSITY, Ithaca, NY (US)

(72) Inventors: Yong Lak Joo, Ithaca, NY (US); Nathaniel S. Hansen, Portland, OR (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/428,103

(22) PCT Filed: Sep. 16, 2013

(86) PCT No.: PCT/US2013/059921
§ 371 (c)(1),
(2) Date: Mar. 13, 2015

(87) PCT Pub. No.: WO2014/043612
PCT Pub. Date: Mar. 20, 2014

(65) Prior Publication Data
US 2015/0247263 A1   Sep. 3, 2015

Related U.S. Application Data

(60) Provisional application No. 61/701,903, filed on Sep. 17, 2012.

(51) Int. Cl.
*D01F 9/10* (2006.01)
*C04B 35/622* (2006.01)
(Continued)

(52) U.S. Cl.
CPC ............. *D01F 9/10* (2013.01); *C01B 31/303* (2013.01); *C01B 31/36* (2013.01);
(Continued)

(58) Field of Classification Search
CPC .... D01F 9/10; D01F 9/14; C09K 5/14; C04B 35/634; C04B 35/6365; C04B 35/62281;
(Continued)

(56) References Cited

U.S. PATENT DOCUMENTS

2008/0187996 A1   8/2008  Bacca et al.

FOREIGN PATENT DOCUMENTS

| KR | 10-0995154 B1 | 11/2010 | |
| WO | 2011097441 A1 | 8/2011 | |
| WO | WO 2011100743 A2 * | 8/2011 | .......... D01D 5/0069 |

OTHER PUBLICATIONS

Li, Dan, and Younan Xia. "Direct fabrication of composite and ceramic hollow nanofibers by electrospinning." Nano letters 4.5 (2004): 933-938.*

(Continued)

*Primary Examiner* — Richard M Rump
(74) *Attorney, Agent, or Firm* — Bond, Schoeneck & King, PLLC; William Greener; Alek Szecsy

(57) ABSTRACT

Provided herein are nanofibers and processes of preparing carbonaceous nanofibers. In some embodiments, the nanofibers are high quality, high performance nanofibers, highly coherent nanofibers, highly continuous nanofibers, or the like. In some embodiments, the nanofibers have increased coherence, increased length, few voids and/or defects, and/or other advantageous characteristics. In some instances, the nanofibers are produced by electrospinning a fluid stock having a high loading of nanofiber precursor in the fluid stock. In some instances, the fluid stock comprises well mixed and/or uniformly distributed precursor in the fluid (Continued)

stock. In some instances, the fluid stock is converted into a nanofiber comprising few voids, few defects, long or tunable length, and the like.

17 Claims, 12 Drawing Sheets

(51) Int. Cl.
D01D 5/00 (2006.01)
D01F 9/14 (2006.01)
C04B 35/634 (2006.01)
C04B 35/636 (2006.01)
C01B 31/30 (2006.01)
C01B 31/36 (2006.01)
C09K 5/14 (2006.01)
D01D 10/02 (2006.01)
H01B 1/04 (2006.01)

(52) U.S. Cl.
CPC .. *C04B 35/62277* (2013.01); *C04B 35/62281* (2013.01); *C04B 35/634* (2013.01); *C04B 35/6365* (2013.01); *C09K 5/14* (2013.01); *D01D 5/0015* (2013.01); *D01D 5/0069* (2013.01); *D01D 10/02* (2013.01); *D01F 9/14* (2013.01); *H01B 1/04* (2013.01); C04B 2235/327 (2013.01); C04B 2235/3244 (2013.01); C04B 2235/3272 (2013.01); C04B 2235/3281 (2013.01); C04B 2235/3284 (2013.01); C04B 2235/3291 (2013.01); C04B 2235/3296 (2013.01); C04B 2235/3418 (2013.01); C04B 2235/40 (2013.01); C04B 2235/449 (2013.01); C04B 2235/48 (2013.01); C04B 2235/526 (2013.01); C04B 2235/5264 (2013.01); C04B 2235/5296 (2013.01); C04B 2235/5409 (2013.01); C04B 2235/5454 (2013.01); C04B 2235/6562 (2013.01); C04B 2235/96 (2013.01); C04B 2235/9607 (2013.01)

(58) Field of Classification Search
CPC ...... C04B 35/62277; C04B 2255/5296; C04B 2235/3291; C04B 2235/3284; C04B 2235/40; D01D 10/02; D01D 5/0015; D01D 5/0069; C01B 31/36; C01B 31/303; H01B 1/04
See application file for complete search history.

(56) References Cited

OTHER PUBLICATIONS

Wang, L., et al. "A novel carbon-silicon composite nanofiber prepared via electrospinning as anode material for high energy-density lithium ion batteries." Journal of Power Sources 195.15 (2010): 5052-5056.*
Gholamvand, Zahra, Seyed Hamed Aboutalebi, and Mansoor Keyanpour-Rad. "Photocatalytic Oxidation of Volatile Organic Compounds Over Electrospun Activated TIO 2/Carbon Nanofiber Composite." International Journal of Modern Physics: Conference Series. vol. 5. World Scientific Publishing Company, 2012.*
International Search Report Form PCT/ISA/220, International Application No. PCT/US2013/059921, pp. 1-16, International Filing Date: Sep. 16, 2013.
Zhang et al., Sep. 2010, Synthesis of Continuous TiC Nanofibers and/or Nanoribbons Through Electrospinning Followed by Carbothermal Reduction, Nanoscale, vol. 2, No. 9, pp. 1670-1673.
Wang et al., 2005, Preparation of Silver Nanoparticles Dispersed in Polyacrylonitrile Nanofiber Film Spun by Electrospinning, Materials Letters, vol. 59, No. 24, pp. 3046-3049.

* cited by examiner

CARBONACEOUS METAL/CERAMIC NANOFIBERS

CROSS-REFERENCE

This application claims the benefit of U.S. Provisional Application No. 61/701,903, filed Sep. 17, 2012, which is incorporated herein by reference in its entirety.

BACKGROUND OF THE INVENTION

Methods for producing ceramic or metallic nanofibers include the electrospinning of sol-gel precursors with or without a polymer binder. However, the nanofibers produced by the sol-gel method have many disadvantages, such as low performance, poor coherence, and limited material options, which makes them unsuitable for many applications.

SUMMARY OF THE INVENTION

Provided herein are carbonaceous nanofibers and processes for producing carbonaceous nanofibers.

In specific embodiments, carbonaceous nanofibers provided herein comprise metal carbide.

In other specific embodiments, carbonaceous nanofibers provided herein comprise (i) a metal component; and (ii) a continuous carbon matrix (e.g., amorphous carbon). In certain instances, the metal component is metal, metal oxide, ceramic, or a combination thereof. In specific embodiments, the carbonaceous nanofibers comprise a continuous matrix of the metal component (e.g., metal carbide). In other specific embodiments, the carbonaceous nanofibers comprise isolated domains of the metal component (e.g., metal oxide, ceramic, elemental metal, or a mixture thereof). In more specific instances, the metal component isolated domains are at least partially distributed along the surface of the nanofiber (e.g., embedded on the surface of the nanofiber, such as illustrated in FIG. 1—additional, or alternative, domains are optionally embedded entirely within the matrix). In some instances, such nanofibers are used for or useful in for use in sensors, batteries, fuel cells, solar cells, ultracapacitors, catalysts, membranes, electrodes, or the like.

Provided in certain embodiments herein is a process of producing one or more carbonaceous nanofiber, the process comprising:
a. electrospinning a fluid stock to produce an electrospun material, the fluid stock comprising (1) a metal reagent component; and (2) polymer, wherein electrospinning of the fluid stock is gas assisted; and
b. treating (e.g., thermally and/or chemically treating) the electrospun (e.g., as spun, or pre-treated) material to produce a carbonaceous nanofiber.

In some embodiments, the carbonaceous nanofiber is a metal carbide nanofiber (e.g., a nanofiber comprising a continuous matrix of metal carbide). In other embodiments, the carbonaceous nanofiber is a nanofiber comprising (i) a metal component; and (ii) a continuous matrix of carbon (e.g., amorphous carbon).

In some embodiments, treatment of the electrospun material is thermal treatment performed a temperature of at least 1000° C. (e.g., between 1000° C. and 1700° C.). In specific embodiments, such treatment conditions are utilized to prepare metal carbide nanofibers (e.g., nanofibers comprising a continuous matrix of metal carbide). In certain embodiments, treatment of the electrospun material is thermal treatment performed a temperature of less than 1200° C. (e.g., about 400° C. and 1200° C.). In specific embodiments, such treatment is performed under inert or reductive conditions (e.g., under argon, nitrogen, or a combination of argon and/or nitrogen and hydrogen). In more specific embodiments, such treatment conditions are utilized to prepare nanofibers comprising a metal component and a continuous matrix of carbon (e.g., with the carbon component—such as metal component nanoparticles—embedded in the carbon matrix).

In specific embodiments, the fluid stock is prepared by combining metal precursor and polymer (e.g., in an aqueous medium). In some embodiments, the fluid stock comprises metal precursor. The metal precursor in a fluid stock may be the same or different than the metal precursor used to prepare the fluid stock, as upon addition with the polymer (e.g., in an aqueous medium), some or all of the metal precursor may associate with the polymer—e.g., as illustrated in FIG. 3 and FIG. 4. In some embodiments, the metal precursor (e.g., used to prepare the fluid stock) is a metal carboxylate (e.g., acetate), a metal halide (e.g., chloride), a metal alkoxide (e.g., methoxide, ethoxide, propyl oxide, butyl oxide), a metal diketone (e.g., acetyl acetone), a metal nitrate, or a combination thereof.

In some embodiments, the fluid stock is prepared by combining a plurality of nanoparticles and polymer (e.g., in an aqueous or organic—such as dimethylformamide (DMF)—medium). In some embodiments, the nanoparticles comprise a metal component (e.g., elemental metal, metal alloy, ceramic, metal oxide, or the like). In specific embodiments, the metal reagent component of a process described herein comprises a plurality of metal nanoparticles, a metal oxide nanoparticles, or a combination thereof.

In some embodiments, the nanofibers are electrospun with a gas stream. For example, in specific embodiments, the electrospinning is gas-assisted electrospinning. In more specific embodiments, the gas-assisted electrospinning is coaxial (common-axial) gas assisted electrospinning (e.g., a fluid stock and gas are conconcentrically expressed—e.g., within 5 degrees—about a common axis). In some instances, gas-assisted electrospinning provides for higher fluid throughput and a higher rate of nanofiber production. In certain instances, when nanoparticles are utilized, gas-assisted electrospinning maintains nanoparticle dispersion in the fluid stock (e.g., a high fluid throughput reduces nanoparticle aggregation) in the electrospinning nozzle, which produces nanofibers having a polymer matrix with non-aggregated and/or well dispersed nanoparticles embedded therein.

Provided in specific embodiments herein is a process of producing one or more metal carbide nanofiber, the process comprising:
a. electrospinning a fluid stock to produce an electrospun material, the fluid stock comprising or being prepared by combining (1) metal precursor; and (2) polymer, wherein electrospinning of the fluid stock is gas assisted (e.g., coaxially gas assisted); and
b. thermally treating the electrospun (e.g., as spun, or pre-treated) material at a temperature of at least 800° C. (e.g., at least 1000° C. or 1200° C.), to produce a metal carbide nanofiber (e.g., a nanofiber comprising a continuous matrix of metal carbide).

Provided in further or alternative embodiments herein is a process of producing one or more metal carbide nanofiber, the process comprising:
a. electrospinning a fluid stock to produce an electrospun material, the fluid stock comprising (1) a plurality of nanoparticles, the plurality of nanoparticles comprising metal and/or metal oxide; and (2) polymer, wherein electrospinning of the fluid stock is gas assisted (e.g., coaxially gas assisted); and b. thermally treating the electrospun (e.g., as spun, or pre-treated) material at a temperature of at least 800° C. (e.g., at least 1000° C. or 1200° C.), to produce a metal carbide nanofiber (e.g., a nanofiber comprising a continuous matrix of metal carbide).

Provided in specific embodiments herein is a process of producing one or more carbon nanocomposite nanofiber (e.g., comprising a continuous carbon matrix with metal component embedded therein), the process comprising:

a. electrospinning a fluid stock to produce an electrospun material, the fluid stock comprising or being prepared by combining (1) metal precursor; and (2) polymer, wherein electrospinning of the fluid stock is gas assisted (e.g., coaxially gas assisted); and b. thermally treating the electrospun (e.g., as spun, or pre-treated) material at a temperature of at less than 1200° C. (e.g., 400° C. or 1000° C.), to produce a carbon nanocomposite nanofiber (e.g., a nanofiber comprising a continuous matrix of carbon with metal component embedded therein).

Provided in further or alternative embodiments herein is a process of producing one or more carbon nanocomposite nanofiber, the process comprising:

a. electrospinning a fluid stock to produce an electrospun material, the fluid stock comprising (1) a plurality of nanoparticles (e.g., the plurality of nanoparticles comprising metal, metal oxide, metal carbide, or the like); and (2) polymer, wherein electrospinning of the fluid stock is gas assisted (e.g., coaxially gas assisted); and b. thermally treating the electrospun (e.g., as spun, or pre-treated) material at a temperature of at less than 1200° C. (e.g., 400° C. or 1000° C.), to produce a carbon nanocomposite nanofiber (e.g., a nanofiber comprising a plurality of nanoparticles—e.g., well dispersed and/or non-aggregated nanoparticles—embedded therein).

In various embodiments, nanoparticles used in any processes or found in any nanofibers described herein have an average diameter of 1-200 nm, e.g., 1-100 nm.

In some embodiments, metal of the metal component (e.g., metal precursor, or metal containing nanoparticles) metal of the metal component of a process or nanofiber described herein is Ag, Cu, Ni, Fe, Co, Pb, Au, Sn, Al, Zr, Mn, Be, Cd, Si, Ti, V, Hf, Sr, Ba, Ge, or combinations thereof. In certain embodiments, the polymer of a process or nanofiber described herein is polyvinyl alcohol (PVA), polyvinyl acetate (PVAc), polyethylene oxide (PEO), polyvinyl ether, polyvinyl pyrrolidone, polyglycolic acid, hydroxyethylcellulose (HEC), ethylcellulose, cellulose ethers, polyacrylic acid, polyisocyanate, or a combination thereof. In some embodiments, the polymer is hydrophilic, water soluble, water swellable, thermally degradable, chemically degradable, or any combination thereof. In certain embodiments, the polymer is a polymer comprising a plurality of nucleophilic moieties and the reagent precursor (e.g., metal precursor that is added to the fluid stock) is electrophilic (e.g., to allow good dispersion of precursor, such as illustrated in FIG. 3). In other embodiments, the polymer is a polymer comprising a plurality of electrophilic moieties and the reagent precursor is nucleophilic.

In certain embodiments, provided herein are processes or electrospun nanofibers comprising metal component to polymer in a ratio of at least 1:2 (e.g., over 1:2, at least 1:1, over 1:1, at least 3:2, or the like). In some embodiments, precursor and polymer are combined in the fluid stock at a ratio of at least 1:2 (e.g., over 1:2, at least 1:1, over 1:1, at least 3:2, or the like). In some embodiments, the fluid stock is aqueous. In specific embodiments, the fluid stock is aqueous and comprises or is prepared by combining metal component and polymer in a metal component (e.g., metal precursor) to polymer in a ratio of at least 1:2 (e.g., over 1:2, at least 1:1, over 1:1, at least 3:2, or the like). In certain embodiments, the metal precursor (e.g., as measured by the amount of metal present—whether associated with a polymer or not) is present in the fluid stock in a concentration of at least 200 mM (e.g., at least 250 mM, or at least 300 mM). In specific embodiments, the metal precursor (or metal thereof) is present in the fluid stock in a concentration of at least 200 mM (e.g., at least 250 mM, or at least 300 mM), the fluid stock is aqueous, and the fluid stock comprises or is prepared by combining metal component and polymer in a metal component (e.g., metal precursor) to polymer in a ratio of at least 1:2 (e.g., over 1:2, at least 1:1, over 1:1, at least 3:2, or the like). In some embodiments, the fluid stock is (1) a solution; (2) a substantially uniform dispersion; or (3) a substantially homogenous dispersion.

The process of any one of the preceding claims, wherein the weight-to-weight ratio of the precursor(s) to polymer in the fluid stock is at least 1:2 (e.g., at least 1:1, at least 2:1, 1:1 to 4:1) and the fluid stock is aqueous.

In some embodiments, the fluid stock further comprises a reagent precursor or is prepared by combining reagent precursor(s), a metal component, and polymer. In more specific embodiments, the fluid stock is aqueous. In some embodiments, the reagent precursor(s) (e.g., metal precursor that is combined to make the fluid stock and is not (yet) associated with polymer) and reagent polymer(s) (e.g., polymer that is combined to make the fluid stock and is not (yet) associated with the precursor) are combined in a weight to weight ratio of over 1:2 (e.g., at least 1:1). In some embodiments, once combined in a fluid stock, the one or more of the reagent and polymer precursor(s) are present in the fluid stock in a polymer-precursor association—also encompassed herein by the description of a composition comprising metal precursor and polymer, unless otherwise noted. In some embodiments, a fluid stock described herein comprises polymer, and at least 25% (e.g., at least 50%, at least 75%) of the polymer is saturated with precursor molecules. In further or alternative embodiments, at least 25% (e.g., at least 50%, at least 75%) of the precursor molecules are associated with polymer.

Provided in certain embodiments herein are nanofibers comprising metal carbide (e.g., a continuous matrix of metal carbide). In specific embodiments, the nanofiber comprises at least 50 wt. % (e.g., at least 60 wt. %, at least 70 wt. %, at least 80 wt. %, at least 90 wt. %, at least 95 wt. %) metal carbide. In some embodiments, the nanofibers comprise a continuous matrix of metal carbide (e.g., along at least 90%, on average, of the length of the nanofibers). In specific embodiments, the metal carbide is silicon carbide. In some embodiments, the nanofibers have good performance characteristics, such as an average ultimate strength-to-diameter ratio of at least 2 MPa/nm and an average Young's modulus-to-diameter ratio of at least 16 GPa/nm. In more specific embodiments, the nanofibers have an average ultimate strength-to-diameter ratio of at least 5 MPa/nm and an average Young's modulus-to-diameter ratio of at least 40 GPa/nm. In further or alternative embodiments, the nanofibers have an average fracture toughness of at least 3.5 MPa·m½. In further or alternative embodiments, the nanofibers have a log(S/m) to log(S/m) ratio with an identical bulk material of at least 0.5. In some embodiments, metal carbide nanofibers described herein have any characteristic described for metal carbide nanofibers prepared according to any process described herein.

Provided in some embodiments herein are nanofibers comprising (i) a metal component; and (ii) a continuous matrix of carbon (e.g., amorphous carbon). In specific embodiments, the metal component is embedded within the continuous carbon matrix (e.g., embedded on the surface of the nanofiber—such as being partially surrounded by carbon (e.g. as illustrated by 103), inside the nanofiber—such as being completely surrounded by carbon, or a combination thereof). In some embodiments, the metal component is well dispersed in the carbon matrix. In further or alternative embodiments, the metal component is non-aggregated in the carbon matrix. In some embodiments, the metal component comprises metal, metal oxide, ceramic, or a combination thereof. In specific embodiments, the metal component comprises metal. In more specific embodiments, the metal is not silicon. In specific embodiments, the metal component comprises metal oxide (e.g., a mixed metal oxide). In more specific embodiments, the metal oxide (e.g., mixed metal oxide) does not comprise lithium. In certain embodiments, the nanofibers comprise isolated domains (e.g., nanoparticles) of the metal component.

Provided in some embodiments herein are nanofibers comprising (i) a plurality of nanoparticles; and (ii) a continuous matrix of carbon (e.g., amorphous carbon). In specific embodiments, the plurality of nanoparticles is embedded within the continuous carbon matrix (e.g., embedded on the surface of the nanofiber—such as being partially surrounded by carbon (e.g. as illustrated by 103), inside the nanofiber—such as being completely surrounded by carbon, or a combination thereof). In some embodiments, the plurality of nanoparticles is well dispersed in the carbon matrix. In further or alternative embodiments, the plurality of nanoparticles is non-aggregated in the carbon matrix. In some embodiments, the plurality of nanoparticles comprise metal, metal oxide, ceramic, or a combination thereof. In specific embodiments, the plurality of nanoparticles comprises metal. In more specific embodiments, the metal is not silicon. In specific embodiments, the plurality of nanoparticles comprises metal oxide (e.g., a mixed metal oxide). In more specific embodiments, the metal oxide (e.g., mixed metal oxide) does not comprise lithium.

In some embodiments, the nanofibers comprise at least 90 elemental wt. % (e.g., on average or aggregate) of metal and carbon, when taken together. In certain embodiments, the nanofibers (e.g., on average or in aggregate) comprise 10-50 elemental wt. % of carbon and 40-90 elemental weight % of metal.

In some embodiments, the nanofibers have an average length of at least 50 μm long. In more specific embodiments, the nanofibers have an average length of at least 500 microns. In still more specific embodiments, the nanofibers have an average length of at least 1 mm. In yet more specific embodiments, the nanofibers have an average length of at least 2 mm, or 4 mm, or 5 mm.

In some embodiments, the nanofibers have an average diameter of less than 1 micron. In specific embodiments, the average diameter is about 100 nm to about 1 micron. In more specific embodiments, the average diameter is about 100 nm to about 600 nm. In other specific embodiments, the average diameter is 500 nm or less.

In certain embodiments, the nanofibers have an average aspect ratio of at least about 10 (e.g., at least 100 or at least 1000). In more specific embodiments, the nanofibers have an average aspect ratio of at least 10,000.

In certain embodiments, the nanofibers have an average specific surface area of at least 1 $m^2/g$, at least 10 $m^2/g$, or about 1 $m^2/g$ to about 1000 $m^2/g$.

In certain embodiments, the nanofibers comprise a conductive material, wherein the nanofibers have an conductivity of at least about 10% (e.g., at least 25%) when compared with the conductivity of the conductive material when formed into a sheet.

In some instances, such nanofibers (e.g., metal carbide nanofibers) provide improved performance characteristics (such as fracture toughness, electrical and thermal conductivity, etc.) compared to other nanostructure formation techniques, such as those used to make nanowires, including deposition, precipitation, crystal growth techniques. In some embodiments, the continuous matrix described herein is not a series of nanostructure of stacked particles or precipitates, such as used to prepare nanowires (e.g., deposition, precipitation, or growth techniques).

Such nanofibers may be used in any suitable application, such as in a sensor, a battery, a fuel cell, a solar cell, ultracapacitor, catalyst, membrane, or electrode.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 also illustrates the x-ray crystal diffraction patterns of metal carbide nanofibers described herein.

DETAILED DESCRIPTION OF THE INVENTION

Provided herein are carbonaceous nanofibers, processes for preparing carbonaceous nanofibers, and uses of carbonaceous nanofibers. In some embodiments, the carbonaceous nanofibers comprise a metal component (e.g., a metal, a metal oxide, a ceramic, a metal carbide, or the like). In specific embodiments, the carbonaceous nanofibers are high in metal content (e.g., on an elemental wt % basis). In some specific embodiments, the carbonaceous nanofibers comprise metal carbide (e.g., a continuous matrix of metal carbide). In some embodiment, the carbonaceous nanofibers comprise (i) a metal component, and (ii) a continuous carbon matrix (e.g., amorphous carbon). In certain embodiments, the continuous carbon matrix is a continuous core carbon matrix (e.g., not a hollow carbon tube). In some embodiments, the metal component makes up discrete isolated domains of the carbonaceous nanofibers. In some specific embodiments, the metal component comprises metal, metal oxide, ceramic, or a combination thereof.

Figure 1A:
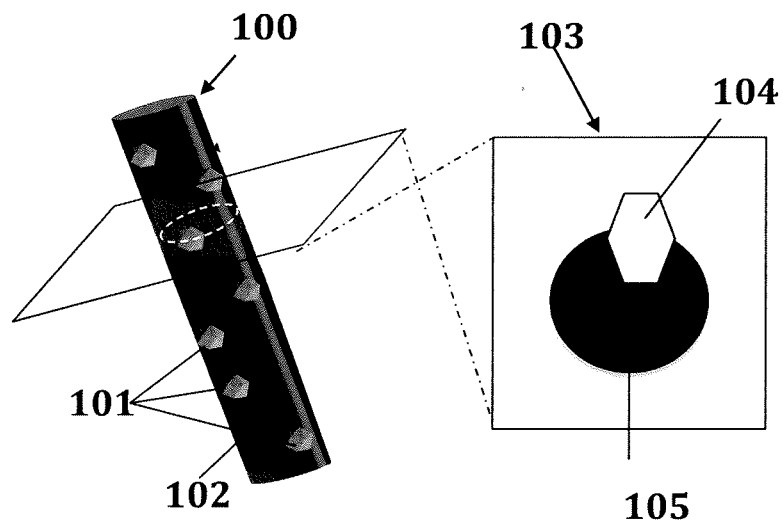
FIG. 1A illustrates a carbonaceous nanofiber provided herein having a continuous core carbon matrix and discrete, isolated domains of metal component (e.g., nanoparticles embedded within the carbon matrix) and FIB. 1B illustrates a continuous hollow carbon matrix with discrete, isolate domains of metal component (e.g., nanoparticles embedded within the carbon matrix).
Figure 1B:
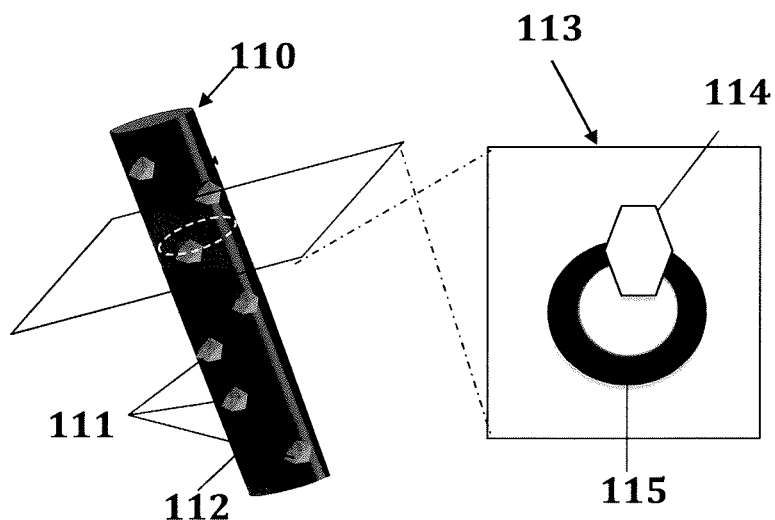

FIG. 1A illustrates a carbonaceous nanofiber 100 comprising (i) discrete domains of metal component 101, and (ii) a continuous core carbon matrix 102. As illustrated in the cross-sectional view 103, the discrete domains of metal component 104 may penetrate into the carbon core 105 of the nanofiber. In some instances, the carbonaceous nanofibers comprise metal component on the surface of the carbonaceous nanofiber. And in some instances, the nanofibers comprise or further comprise discrete domains of metal component (e.g., nanoparticles) completely embedded within the core carbon matrix material. FIG. 1B illustrates a carbonaceous nanofiber 110 comprising (i) discrete domains of metal component 111, and (ii) a continuous hollow carbon matrix 112. As illustrated in the cross-sectional view 113, the discrete domains of metal component 114 may penetrate into the carbon shell 115 and/or into the hollow core of the nanofiber. In some instances, the carbonaceous nanofibers comprise metal component on the surface of the carbonaceous nanofiber. And in some instances, the nanofibers comprise or further comprise discrete domains of metal component (e.g., nanoparticles) completely embedded within the hollow carbon matrix material.

Also, provided in certain embodiments herein is a process for producing carbonaceous nanofibers, the process comprising treating (e.g., thermally treating) an electrospun nanofiber comprising a metal reagent component and a polymer. In some embodiments, the electrospun nanofiber comprising a metal reagent component and a polymer is prepared by electro spinning a fluid stock, the fluid stock comprising (1) a metal reagent component; and (2) polymer. In specific embodiments, the metal reagent component comprises a metal precursor, a metal oxide nanoparticle, a metal nanoparticle, or a combination thereof. In more specific embodiments, the metal reagent component is a metal precursor. In other specific embodiments, the metal reagent component is a metal nanoparticle (e.g., a silicon nanoparticle). In yet other specific embodiments, the metal reagent component is a metal oxide nanoparticle.

In some embodiments, provided herein are high quality nanofibers and processes for preparing high quality nanofibers that have good structural integrity, few voids, few structural defects, tunable length, and the like. In certain embodiments, high loading of precursor, relative to polymer loading, in the fluid stock and/or precursor/electrospun nanofibers, facilitates and/or provides such high quality nanofibers.

Figure 3:
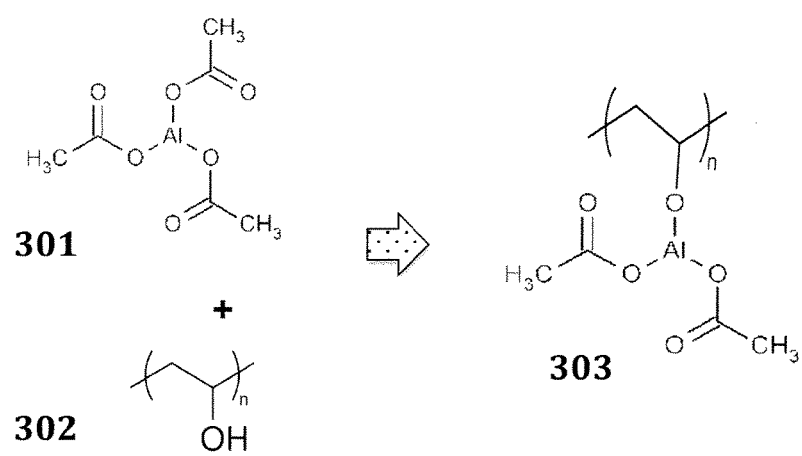
FIG. 3 illustrates an exemplary mechanism for loading of metal precursor onto polymer (e.g., in an aqueous medium).

In further embodiments, a fluid stock provided herein is prepared by combining a metal reagent component and a polymer in an aqueous medium (e.g., in water). In some embodiments, a metal reagent component is combined with the polymer in a metal reagent component to polymer weight-to-weight ratio of at least 1:2 (e.g., at least 1:1). In certain embodiments, a first metal reagent component is combined with a polymer, forming an association (e.g., via a ligand replacement reaction) between the polymer and a second metal reagent component (e.g., a metal-ligand complex wherein one of the ligands of the first metal reagent component is replaced with a polymer moiety). In some embodiments, a fluid stock provided herein may comprise both first and second metal reagent components (e.g., polymer-associated and non-associated metal reagent components). For the purposes of concentration and embodiments herein, reference to a metal reagent component encompasses any metal reagent component present in the fluid stock, whether it is associated with the polymer or not. Similarly, polymer concentration and embodiments provided herein encompass polymer in associated and non-associated forms. Reference to the polymer refers only to the polymer moiety of such an association, and reference to the precursor refers to the precursor moiety of such an association. FIG. 3 illustrates an exemplary metal reagent precursor 301 combined with a polymer 302 to provide a metal precursor-polymer association 303. In some instances such an association process may be complete (i.e., all metal reagent precursor and/or polymer reactive sites may be associated), and in other instances, some of the metal reagent precursor and/or polymer reactive sites (e.g., —OH groups for the PVA of FIG. 3) may remain unassociated. In other words, in some instances, x hydroxyl groups of the PVA may be associated with the precursor, and n-x hydroxyl groups may remain unassociated.

Treatment

In certain embodiments, treatment of an electrospun nanofiber described herein (e.g., a precursor nanofiber comprising a polymer and a metal reagent component) comprises thermally treating the electrospun nanofiber. In further embodiments, treatment of an electrospun nanofiber described herein comprises thermally and/or chemically treating the electrospun nanofiber. In some embodiments, "electrospun nanofibers" include nanofibers that are as-spun nanofibers. Such nanofibers are optionally pretreated (such as processed by sonication, with mortal and pestle, or other method of breaking up nanofibers and/or nanofiber mats, annealing (e.g., at a temperature below sublimation/decomposition of metal precursor or polymer, and/or at a temperature below metal calcination and/or metal carbide formation), or the like).

In some embodiments, treatment of an electrospun nanofiber described herein (e.g., a precursor nanofiber comprising a polymer and a metal reagent component), carbonizes the polymer. In certain embodiments, the same or further treatment comprises conversion of a metal reagent component (e.g., metal-ligand/polymer association) to a metal component (e.g., metal, metal oxide, ceramic, metal carbide, or the like).

In specific embodiments, treatment of an electrospun nanofiber described herein comprises carbonizing the polymer to form (e.g., through at least partial conversion of the polymer) a continuous carbon nanofiber matrix. In more specific embodiments, carbonization of the polymer to a continuous carbon matrix comprises heating the nanofiber at a temperature suitable to carbonize the polymer, but not high enough to remove the polymer and/or cause the carbonized polymer to react with the metal or metal reagent component. In certain embodiments, the nanofiber is heated to a temperature of about 400 to about 1400° C. (e.g., under inert conditions—for example to avoid formation of carbon monoxide and/or carbon dioxide). In specific embodiments, the nanofiber is heated to a temperature of about 400° C. to about 1200° C., or about 600° C. to about 1200° C.

Figure 8:
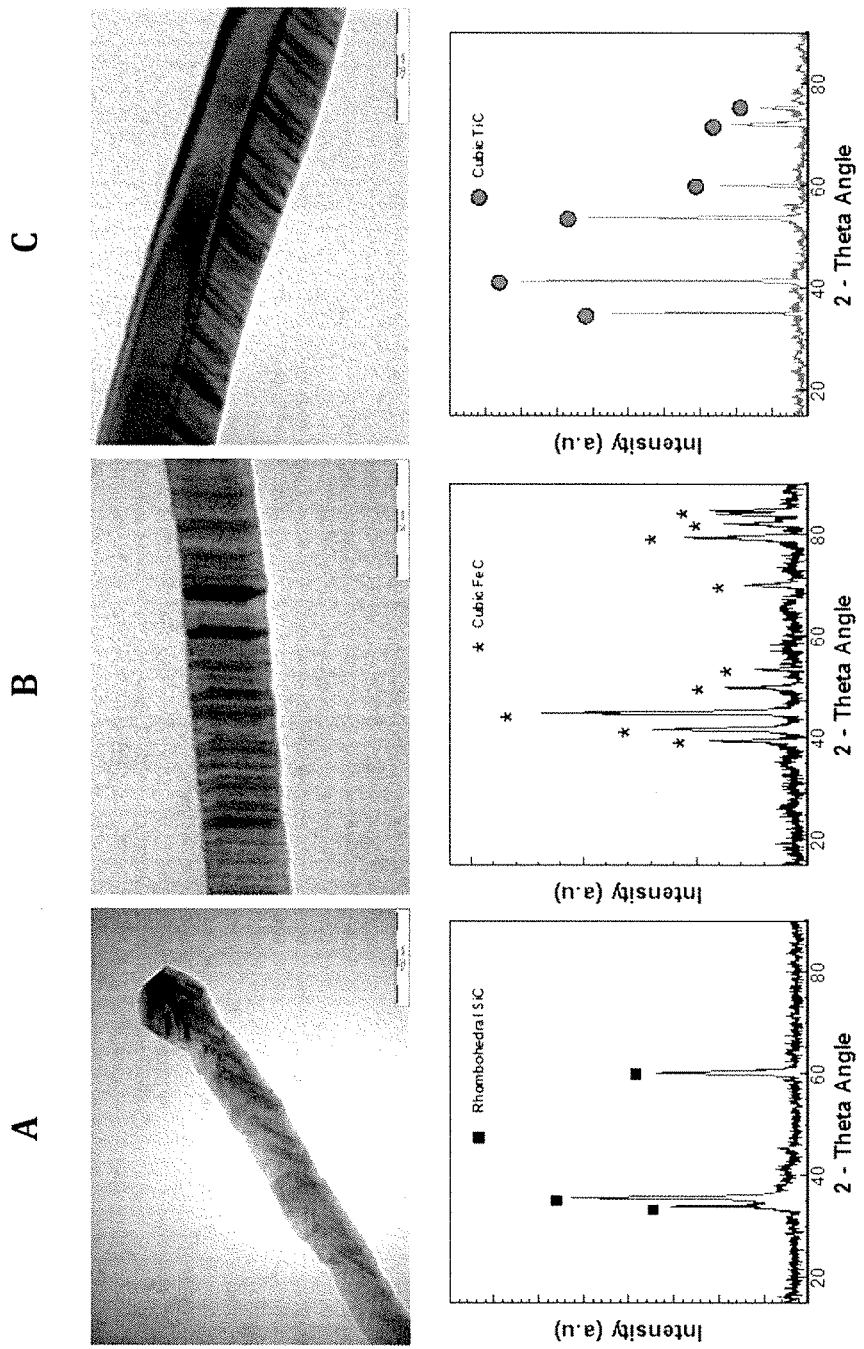
FIG. 8 illustrates TEM images of metal carbide nanofibers described herein and prepared according to processes described herein.

In other specific embodiments, treatment of an electrospun nanofiber described herein comprises carbonizing the polymer, which carbonized polymer reacts with or is reacted with the metal reagent component, forming metal carbide. In some embodiments, the metal carbide formed is a continuous matrix of metal carbide, such as crystalline metal carbide. In specific embodiments, such as illustrated in FIG. 8, such metal carbide matrices are crystalline (e.g., the nanofibers comprise a continuous matrix of crystalline metal carbide), such as having rhombohedral or cubic lattice structures. In more specific embodiments, carbonization of the polymer and reaction of the carbonized polymer with the metal reagent component comprises heating the nanofiber at a temperature suitable to carbonize the polymer and cause the carbonized polymer to react with the metal component. In certain embodiments, the nanofiber is heated to a temperature of about 900° C. to about 2000° C., at least 900° C., at least 1000° C., or the like. In specific embodiments, the nanofiber is heated to a temperature of about 1000° C. to about 1800° C., or about 1000° C. to about 1700° C.

In some embodiments, treatment is performed at a constant or variable temperature. In some embodiments, the treatment conditions comprise using a temperature gradient. In some embodiments, the temperature increases from a first temperature (e.g., the temperature of the electrospinning process, optionally room temperature) to a second temperature. In certain embodiments, treatment conditions comprise utilization of a temperature increase during the treatment process. In some instances, the rate of temperature increase is any suitable rate, for example about 1° C./min to about 35° C./min. In some embodiments, the treatment occurs for any suitable amount of time. In specific embodiments, the dwell time at the maximum (second) temperature occurs for 10 minutes to 20 hours, or any other suitable amount of time.

In some embodiments, the polymer serves as the carbon source, in the absence of any additional carbon source. In other embodiments, additional carbon is optionally utilized (i.e., by adding it to the fluid stock).

In some embodiments, treatment procedures are performed under inert conditions (e.g., under argon or nitrogen). In some instances, treatment procedures are performed under reducing conditions (e.g., under hydrogen, or a mixture of hydrogen and argon). In some embodiments, if a metal component that is a metal is desired, treatment procedures are performed under such reducing conditions. In further embodiments, treatment procedures are performed under oxidative conditions (e.g., under air or other oxygen containing gases). In some embodiments, if a metal component that is a metal oxide or ceramic is desired, treatment procedures are performed under oxidative conditions. In some embodiments, treatment conditions include gaseous conditions, liquid conditions, or the like.

In some instances, treatment of an electrospun nanofiber results in a carbonaceous nanofiber described herein (e.g., nanofiber having a continuous core carbon matrix and discrete isolated domains of metal and/or metal oxide, or metal carbide nanofibers). In some embodiments, the nanofiber consists essentially of pure metal and/or metal oxide and carbon matrix material (i.e., optionally including small amounts of other materials). In some embodiments, the other materials are residual polymer, residual carbonaceous material (e.g., degraded ligand and/or polymer), minor amounts of oxygen (in the case of the metal component being a metal, not a metal oxide), or other components of the fluid stock.

In one aspect, the process has a high yield (e.g., which is desirable for embodiments in which the precursor is expensive). In some embodiments, the metal atoms in the nanofiber are about 10%, about 20%, about 30%, about 33%, about 40%, about 50%, about 60%, about 70%, about 80%, about 90%, about 95%, about 98%, or about 100% of the number of (e.g., in moles) precursor molecules in the fluid stock. In some embodiments, the metal atoms in the nanofiber are at least 10%, at least 20%, at least 30%, at least 33%, at least 40%, at least 50%, at least 60%, at least 70%, at least 80%, at least 90%, at least 95%, at least 98%, or at least 99% of the moles of precursor molecules in the fluid stock. In some embodiment, the moles of precursor molecules in the nanofiber are between about 10% and about 40%, between about 20% and about 50%, or between about 50% and about 100% of the moles of precursor molecules in the fluid stock.

Loading

In some embodiments, high loading of metal reagent component (e.g., concentration and/or relative to polymer) and homogeneity in fluid stocks and/or precursor nanofibers facilitate and/or provide pure and/or uniform carbonaceous nanofibers following treatment. In certain instances, few defects and/or voids are created in the nanofiber when upon treatment compared to the number of defects and/or voids created when having lower precursor loading.

In various embodiments, the fluid stock comprises a substantially uniform and/or homogenous dispersion or solution (e.g., as measured by viscosity deviations, UV absorbance, or the like). In some embodiments, the fluid stock is aqueous (i.e., comprises water). In certain instances, use of water in the fluid stock facilitates the dispersion of the metal reagent component (e.g., metal precursor), facilitates forming metal reagent component-polymer associations in the fluid stock, and facilitates forming a uniform and/or homogenous dispersion/solution.

In some embodiments, the fluid stock uniform or homogenous. In specific embodiments, the process described herein comprises maintaining fluid stock uniformity or homogeneity. In some embodiments, fluid stock uniformity and/or homogeneity is achieved or maintained by any suitable mechanism, e.g., by agitating, heating, or the like. Methods of agitating include, by way of non-limiting example, mixing, stirring, shaking, sonicating, or otherwise inputting energy to prevent or delay the formation of more than one phase in the fluid stock. In some embodiments, the fluid stock is continually agitated. In some embodiments, the fluid stock is agitated to create a uniform dispersion or solution, which is then used in an electrospinning step before the fluid stock (e.g., dispersion or solution) loses uniformity and/or homogeneity (e.g., it before it separates into more than one phase).

In some instances, loading is represented as the weight ratio of the metal reagent component to polymer in the fluid stock or precursor nanofiber (the metal reagent component being in associated and/or non-associated form). The weight ratio of the metal reagent component to polymer is any value resulting in a nanofiber with suitable properties in a given embodiment. The weight ratio of the metal reagent component to polymer is at least 1:2 in some embodiments. In other embodiments, the ratio is at least 1:9, at least 1:8, at least 1:7, at least 1:6, at least 1:5, at least 1:4, at least 1:3, at least 1:2, at least 1:1.75, at least 1:1.5, or at least 1:1.25. In other embodiments there is about equal weights of metal reagent component and polymer. In some embodiments, there is more metal reagent component than polymer by weight. In some embodiments, the weight ratio of the metal reagent component to polymer is at least 1.25:1, at least 1.5:1, at least 1.75:1, at least 2:1, at least 3:1, or at least 4:1. In yet other embodiments, the weight ratio of metal reagent component to polymer is about 1:2 to about 5:1, or about 1:1 to about 4:1. In some embodiments, all or part of the metal reagent component is associated with the polymer and the metal reagent component to polymer weight-to-weight ratio is determined by the ratio of the sum of the associated and non-associated metal reagent component to the polymer.

The fluid stock contains any suitable amount of polymer. The weight percent of polymer in the fluid stock is represented as the weight percent of polymer (whether the polymer is associated with metal reagent or not). In some embodiments, the fluid stock comprises at least about 0.5 weight %, at least about 1 weight %, at least about 2 weight %, at least about 3 weight %, at least about 4 weight %, at least about 5 weight %, at least about 6 weight %, at least about 7 weight %, at least about 8 weight %, at least about 9 weight %, at least about 10 weight %, at least about 12 weight %, at least about 14 weight %, at least about 16 weight %, at least about 18 weight %, at least about 20 weight %, at least about 30 weight %, or at least about 40 weight % polymer. In some embodiments, the fluid stock comprises from about 1 weight % to about 20 weight % polymer. In some embodiments, the fluid stock comprises from about 1 weight % to about 10 weight %, from about 1 weight % to about 5 weight %, from about 5 weight % to about 20 weight %, from about 5 weight % to about 10 weight %, from about 10 weight % to about 15 weight %, or from about 15 weight % to about 20 weight % polymer.

In certain embodiments, polymer concentration in the fluid stock is determined on a monomeric residue concentration. In other words, the concentration of the polymer is determined based on the concentration of polymeric repeat units present in the stock. For example, polymer concentration of polyvinyl alcohol may be measured based on the concentration of ($-CH_2CHOH-$) present in the fluid stock. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In at least 5 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the precursor in the fluid stock is between 5 mM and 5 M, between 200 mM and 1 M, between 100 mM and 700 mM, and the like. In some embodiments, the concentration of metal reagent (e.g., precursor) in the fluid stock to monomeric residue in the fluid stock is at least 1:4. In specific embodiments, the concentration of metal reagent (e.g., precursor) in the fluid stock to monomeric residue in the fluid stock is at least 1:3. In more specific embodiments, the concentration of metal reagent (e.g., precursor) in the fluid stock to monomeric residue in the fluid stock is at least 1:2. In still more specific embodiments, the concentration of metal reagent (e.g., precursor) in the fluid stock to monomeric residue in the fluid stock is at least 1:1.2. In yet more specific embodiments, the concentration of metal reagent (e.g., precursor) in the fluid stock to monomeric residue in the fluid stock is about 1:1 (e.g., within 5%). In other embodiments, the concentration of metal reagent (e.g., precursor) in the fluid stock to monomeric residue in the fluid stock is at least 1:10, at least 1:8, at least 1:6, at least 1:1.5, at least 1:3.5, at least 1:2.5, or any suitable ratio.

In some embodiments, the fluid stock comprises metal reagent (e.g., precursor) and polymer, wherein at least 5 elemental wt. % of the total mass of the metal reagent (e.g., precursor) and polymer is metal. In certain embodiments, at least 10 elemental wt. % of the total mass of the metal reagent (e.g., precursor) and polymer is metal. In specific embodiments, at least 15 elemental wt. % of the total mass of the metal reagent (e.g., precursor) and polymer is metal. In more specific embodiments, at least 20 elemental wt. % of the total mass of the metal reagent (e.g., precursor) and polymer is metal. In specific embodiments, at least 25 elemental wt. % of the total mass of the metal reagent (e.g., precursor) and polymer is metal. In still more specific embodiments, at least 30 elemental wt. % of the total mass of the metal reagent (e.g., precursor) and polymer is metal. In yet more specific embodiments, at least 35 elemental wt. % of the total mass of the metal reagent (e.g., precursor) and polymer is metal. In more specific embodiments, at least 40 elemental wt. % of the total mass of the metal reagent (e.g., precursor) and polymer is metal. In various embodiments, at least 10 elemental wt. %, at least 15 elemental wt. %, at least 45 elemental wt. %, at least 50 elemental wt. % of the total mass of the metal reagent (e.g., precursor) and polymer is metal.

In one aspect, the concentration of metal reagent (e.g., precursor) in the fluid stock is high. The concentration is any suitable concentration. In some embodiments, the concentration of the metal reagent (e.g., precursor) in the fluid stock is about 5 mM, about 10 mM, about 20 mM, about 40 mM, about 60 mM, about 80 mM, about 100 mM, about 150 mM, about 200 mM, about 250 mM, about 300 mM, about 350 mM, about 400 mM, about 500 mM, about 700 mM, about 900 mM, about 1.2 M, about 1.5 M, about 2 M, about 5 M, and the like. In some embodiments, the concentration of the metal reagent (e.g., precursor) in the fluid stock is at least 5 mM, at least 10 mM, a at least 20 mM, at least 40 mM, at least 60 mM, at least 80 mM, at least 100 mM, at least 150 mM, at least 200 mM, at least 250 mM, at least 300 mM, at least 350 mM, at least 400 mM, at least 500 mM, at least 700 mM, at least 900 mM, at least 1.2 M, at least 1.5 M, at least 2 M, at least 5 M, and the like. In some embodiments, the concentration of the metal reagent (e.g., precursor) in the fluid stock is between 5 mM and 5 mM, between 20 mM and 1 M, between 100 mM and 700 mM, between 100 mM and 300 mM, and the like.

In some embodiments, a fluid stock is prepared by (i) dissolving or dispersing a metal reagent (e.g., precursor) in a first fluid (e.g., water, or another aqueous medium) to form a first composition; (ii) dissolving or dispersing a polymer in a second fluid (e.g., water, or another aqueous medium) to form a second composition; and (iii) combining at least a portion of the first and second compositions to form the fluid stock.

In some embodiments, the fluid stock and/or precursor nanofiber comprises a high loading of metal reagent component. In some embodiments, the polymer is at least 20% loaded with metal reagent component (i.e., at least 20% of the reactive sites of the polymer are associated with a metal reagent component). In specific embodiments, the polymer is at least 35% loaded with metal reagent component. In more specific embodiments, the polymer is at least 50% loaded with metal reagent component. In still more specific embodiments, the polymer is at least 75% loaded with metal reagent component. In various embodiments, the polymer is at least 20%, at least at least 30%, at least 40%, at least 50%, at least 60%, at least 70%, at least 75%, at least 80%, at least 85%, at least 85%, at least 90%, at least 95%, at least 96%, at least 97%, at least 98%, or at least 99% loaded with metal reagent component. In some instances, the polymer is about 50% to 100%, about 70% to 100%, about 90% to 100%, about 50% to about 90%, about 60% to about 80%, or about 20% to about 50% loaded with metal reagent component.

In some embodiments, the metal reagent component present in the fluid stock or precursor nanofiber is at least 80% associated with the polymer. In more specific embodiments, the precursor present in the fluid stock is at least 90% associated with the polymer. In still more specific embodiments, the precursor present in the fluid stock is at least 95% associated with the polymer. In other specific embodiments, the precursor present in the fluid stock is at least 20%, at least 30%, at least 40%, at least 50%, at least 60%, at least 70%, at least 75%, at least 85%, at least 98%, or at least 99% associated with the polymer.

Figure 4:
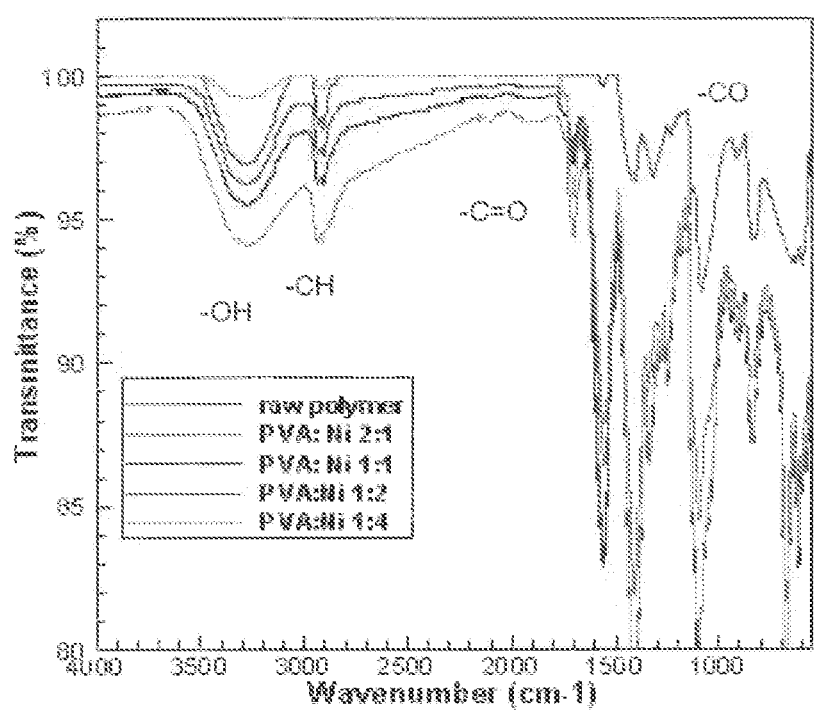
FIG. 4 illustrates an FTIR spectrum demonstrating the increased loading of metal precursor onto polymer (PVA).

Loading and/or association between metal reagent component and polymer can be determined by any suitable mechanism, e.g., nuclear magnetic resonance (NMR) spectrometry, infrared (IR) spectrometry, or the like. For example, FIG. 4 illustrates the increased loading of precursor on the polymer (e.g., by the decreasing intensity of the —OH peak).

In some instances, there is some cross-linking between polymers, e.g., through a metal reagent component. In some embodiments, the polymers of a fluid stock described herein are less than 20% cross-linked (e.g., less than 20% of the metal reagent component are associated with 2 or more polymers and/or less than 20% of the monomeric units of the polymer are connected, e.g., via a metal reagent component, to another polymer). In some embodiments, the polymers are less than 10% cross-linked. In specific embodiments, the polymers are less than 5% cross-linked. In more specific embodiments, the polymers are less than 3% cross-linked. In still more specific embodiments, the polymers are less than 2% cross-linked. In yet more specific embodiments, the polymers are less than 1% cross-linked.

In some embodiments, precursor nanofibers provided herein comprise a polymer and (e.g., on average) at least 5 elemental wt. % metal. In certain embodiments, precursor nanofibers provided herein comprise a polymer and (e.g., on average) at least 10 elemental wt. % metal. In specific embodiments, precursor nanofibers provided herein comprise a polymer and (e.g., on average) at least 15 elemental wt. % metal. In more specific embodiments, precursor nanofibers provided herein comprise a polymer and (e.g., on average) at least 20 elemental wt. % metal. In specific embodiments, metal constitutes (e.g., on average) at least 25 elemental wt. % precursor nanofiber(s). In still more specific embodiments, metal constitutes (e.g., on average) at least 30 elemental wt. % of the precursor nanofiber(s). In yet more specific embodiments, metal constitutes (e.g., on average) at least 35 elemental wt. % of the precursor nanofiber(s). In more specific embodiments, metal constitutes (e.g., on average) at least 40 elemental wt. % of the precursor nanofiber(s). In various embodiments, metal constitutes (e.g., on average) at least 10 elemental wt. %, at least 15 elemental wt. %, at least 45 elemental wt. %, at least 50 elemental wt. % of the precursor nanofiber(s).

In some embodiments, an electrospun precursor nanofiber comprises metal reagent component and polymer, wherein the metal reagent component and polymer when taken together make up at least 50%, at least 60%, at least 70%, at least 80%, at least 90%, at least 95%, or at least 98% of the total mass of the nanofiber.

In some instances, a process of preparing carbonaceous nanofibers may leave defects such as gaps, voids, and the like in the resultant nanofiber. In some embodiments, these defects are reduced by increasing the proportion of metal reagent component in the fluid stock and/or precursor/electrospun nanofiber relative to the amount of polymer. In some embodiments, increasing homogeneity of the fluid stock reduces the voids and/or defects in the nanofiber compared to when the fluid stock is not homogenous. In some instances, when the fluid feed is electrospun and converted to a nanofiber, use of homogenous fluid feed leads to a homogenous electrospun nanofiber.

In some embodiments, associating the precursor with the polymer, such as through a chemical bond between the precursor and polymer results in long, high quality nanofibers with few defects compared to embodiments without an association between the precursor and polymer. In some instances, the precursor is distributed relatively homogenously on the polymer (e.g., such that electrospinning of the fluid stock having such homogenous associations provides nanofibers with few voids and defects). In addition to the association, it is advantageous in some embodiments to first create a homogenous solution of precursor before combining the precursor and polymer.

Metal

In specific embodiments, the metal reagent component of a process or composition described herein comprises a metal precursor, a metal nanoparticle, a metal oxide nanoparticle, a ceramic nanoparticle, or a combination thereof. In specific embodiments, the metal of the metal reagent component comprises an alkali metal (e.g., an alkali metal precursor, alkali metal oxide nanoparticle, or the like). In further or alternative embodiments, the metal of the metal reagent component comprises an alkaline earth metal (e.g., an alkali earth metal precursor, an alkali earth metal oxide nanoparticle, or the like). In certain embodiments, the metal of the metal reagent component comprises a transition metal (e.g., a transition metal precursor, a transition metal oxide nanoparticle, a transition metal nanoparticle, or the like). In some embodiments, the metal of the metal reagent component comprises a period IV transition metal. In certain embodiments, the metal of the metal reagent component comprises a period V transition metal. In some embodiments, the metal of the metal reagent component comprises a group XIII metal. In certain embodiments, the metal of the metal reagent component comprises a group XIV metal. In certain embodiments, the metal of the metal reagent component comprises a metalloid (e.g., a metalloid precursor, a metalloid nanoparticle, a metalloid oxide nanoparticle, or the like). In specific embodiments, metal of the metal reagent component comprises aluminum, silicon, calcium, titanium, vanadium, chromium, manganese, iron, cobalt, nickel, copper, zinc, gallium, germanium, zirconium, cadmium, tin, barium, hafnium, tungsten, lead, combinations thereof, or the like. In various instances, the metal is a transition metal, alkali metal, alkaline earth metal, post-transition metal, lanthanide, or actinide. Transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Alkali metals include: lithium (Li), sodium (Na), potassium (K), rubidium (Rb), cesium (Cs) and francium (Fr). Alkaline earth metals include: beryllium (Be), magnesium (Mg), calcium (Ca), strontium (Sr), barium (Ba), and radium (Ra). Post-transition metals include: aluminum (Al), gallium (Ga), indium (In), tin (Sn), thallium (Tl), lead (Pb), and bismuth (Bi). Lanthanides include the elements with atomic number 57 to 71 on the periodic table. Actinides include the elements with atomic number 89 to 103 on the periodic table. In addition, silicon (Si), germanium (Ge), antimony (Sb) and polonium (Po) are considered metals for the purposes of the present disclosure. In some embodiments, silicon is used in the process described herein to produce silicon nanofibers. In specific embodiments, the metal of the metal reagent (e.g., precursor) is a transition metal. In some specific embodiments, the metal of the metal reagent (e.g., precursor) is silicon. In other specific embodiments, the metal of the metal reagent (e.g., precursor) is not silicon. In more specific embodiments, the metal reagent is not silicon nanoparticles. In other specific embodiments, the metal reagent is not silica nanoparticles. In further or alternative embodiments, the metal of the metal reagent (e.g., precursor) is aluminum. In other specific embodiments, the metal of the metal reagent (e.g., precursor) is not aluminum. In certain embodiments, the metal reagent is not lithium-containing nanoparticles. In some embodiments, the metal reagent is not nanoparticles comprising silicon (in any oxidation state—e.g., elemental silicon and silicon dioxide) and is not nanoparticles comprising lithium (in any oxidation state—e.g., lithium oxide). In some embodiments, the metal reagent comprises at least two different metals.

In specific embodiments, the metal reagent is a metal precursor. In some embodiments, the precursor is a metal containing compound that is associated with at least one ligand. In certain embodiments, the metal-ligand association is associated via any suitable type of bond or interaction (e.g., an ionic bond, a covalent bond, =coordination complex between ligand and metal, or the like). In some instances a precursor described herein is associated with a polymer instead of, or in addition to, other ligands—such compounds are intended to be considered was metal-ligand associations (whether or not additional ligands are present).

In specific embodiments, the metal precursor is a metal-ligand association (complex) (e.g., a coordination complex), each metal precursor comprising metal atom(s) associated (complexed) with one or more ligand(s) (e.g., 1-10, 2-9, or any suitable number of ligands). In specific embodiments, the precursor described herein comprises at least two different types of ligand (e.g., at least one acetate and at least one halide). In some embodiments, the precursor is a metal carboxylate (e.g., —OCOCH$_3$ or another —OCOR group, wherein R is an alkyl, substituted alkyl, aryl, substituted aryl, or the like). In certain embodiments, the precursor is a metal nitrate. In some embodiments, the precursor is a metal alkoxide (e.g., a methoxide, ethoxide, isopropyl oxide, t-butyl oxide, or the like). In some embodiments, the precursor is a metal halide (e.g., chloride, bromide, or the like). In certain embodiments, the precursor is a diketone (e.g., acetylacetone, hexafluoroacetylacetone, or the like). In other embodiments, any suitable ligand may be utilized in a metal-ligand association (metal precursor) described herein, e.g., ketones, diketones (e.g., a 1,3-diketone, such as ROCCHR'COR group, wherein R is an alkyl, substituted alkyl, aryl, substituted aryl and R' is R or H), carboxylates (e.g., acetate or —OCOR group, wherein each R is independently an acetyl, substituted acetyl, an alkyl, substituted alkyl, aryl, substituted aryl), halides, nitrates, amines (e.g., NR'$_3$, wherein each R" is independently R or H or two R", taken together form a heterocycle or heteroaryl), and combinations thereof. Further examples include iodide, bromide, sulfide (e.g., —SR), thiocyanate, chloride, nitrate, azide, fluoride, hydroxide, oxalate, water, nitrite (e.g., RN$_3$), isothiocyanate, acetonitrile, pyridine, ammonia, ethylenediamine, 2,2'-bipyridine, 1,10-phenanthroline, nitrite, triphenylphosphate, cyanide, carbon monoxide, or alko-oxide. In specific embodiments, a substituted group is optionally substituted with one or more of H, halo, CN, OH, NO$_2$, NH$_2$, NH(alkyl) or N(alkyl)(alkyl), SO$_2$alkyl, CO$_2$-alkyl, alkyl, heteroalkyl, alkoxy, S-alkyl, cycloalkyl, heterocycle, aryl, or heteroaryl.

In some embodiments, a fluid stock provided herein comprises at least two different types of metal reagent components. In certain embodiments, a carbonaceous nanofiber provided herein comprises at least two different types of metal components.

In some embodiments, the metal component of a process or carbonaceous nanofiber described herein comprises a metal (i.e., elemental metal), metal oxide (e.g., metal oxide ceramic), ceramic, metal carbide, or the like. Metals include any suitable metal, such as a period IV transition metal, a period V transition metal, a group XIII metal, a group XIV metal, a metalloid (e.g., Si, Ge). In specific embodiments, metal component comprises aluminum, silicon, calcium, titanium, vanadium, chromium, manganese, iron, cobalt, nickel, copper, zinc, gallium, germanium, zirconium, cadmium, tin, barium, hafnium, tungsten, lead, combinations thereof, or the like. In specific embodiments, metal of the metal component comprises aluminum, silicon, calcium, titanium, vanadium, chromium, manganese, iron, cobalt, nickel, copper, zinc, gallium, germanium, zirconium, cadmium, tin, barium, hafnium, tungsten, lead, combinations thereof, or the like. In various instances, the metal is a transition metal, alkali metal, alkaline earth metal, post-transition metal, lanthanide, or actinide. Transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Alkali metals include: lithium (Li), sodium (Na), potassium (K), rubidium (Rb), cesium (Cs) and francium (Fr). Alkaline earth metals include: beryllium (Be), magnesium (Mg), calcium (Ca), strontium (Sr), barium (Ba), and radium (Ra). Post-transition metals include: aluminum (Al), gallium (Ga), indium (In), tin (Sn), thallium (Tl), lead (Pb), and bismuth (Bi). Lanthanides include the elements with atomic number 57 to 71 on the periodic table. Actinides include the elements with atomic number 89 to 103 on the periodic table. In addition, silicon (Si), germanium (Ge), antimony (Sb) and polonium (Po) are considered metals for the purposes of the present disclosure. In specific embodiments, the metal of the metal component is a transition metal. In some specific embodiments, the metal of the metal component is silicon.

Polymer

In specific embodiments, the polymer is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Water soluble or swellable polymers are generally at least somewhat hydrophilic. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like).

In certain embodiments, the polymer is a nucleophilic polymer (e.g., a polymer comprising alcohol groups, such as PVA). In some embodiments, the polymer is a nucleophilic polymer and a first precursor (e.g., reagent precursor) is an electrophilic precursor (e.g., a metal acetate, metal chloride, or the like). In specific embodiments, the precursor-polymer association is a reaction product between a nucleophilic polymer and an electrophilic first precursor (e.g., reagent precursor).

In other embodiments, the polymer is an electrophilic polymer (e.g., a polymer comprising chloride or bromide groups, such as polyvinyl chloride). In some embodiments, the polymer is an electrophilic polymer and a first precursor (e.g., reagent precursor) is a nucleophilic precursor (e.g., metal-ligand complex comprising "ligands" with nucleophilic groups, such as alcohols or amines). In specific embodiments, the precursor-polymer association is a reaction product between an electrophilic polymer and a nucleophilic first precursor.

In some embodiments, the polymer imparts a suitable elongational viscosity to the fluid stock for electrospinning nanofibers. In some embodiments, low shear viscosity leads to beaded nanofibers. In one aspect, uniform distribution of the precursor in the fluid feed helps to maintain a suitably high elongational viscosity.

In some embodiments, the polymer or fluid stock has an viscosity of at least 50 poise, at least 100 poise, at least 200 poise, at least 300 poise, at least 400 poise, at least 500 poise, at least 600 poise, at least 800 poise, at least 1,000 poise, at least 1,500 poise, at least 2,000 poise, at least 2,500 poise, at least 3,000 poise, at least 5,000 poise, and the like. A polymer in used in a process or found in a composition herein has any suitable molecular weight. In some embodiments, the polymer has a molecular weight of at least 20,000 atomic mass units ("amu"), at least 50,000 amu, at least 100,000 amu, at least 200,000 amu, at least 300,000 amu, at least 400,000 amu, at least 500,000 amu, at least 700,000 amu, or at least 1,000,000 amu and the like. A polymer in used in a process or found in a composition herein has any suitable PDI (weight average molecular weight divided by the number average molecular weight). In some embodiments, the polymer has a polydispersity index of about 1 to about 10, about 2 to about 5, about 1 to about 5, or the like.

In some embodiments, provided herein are fluid stocks comprising and/or methods comprising electrospinning a fluid stock comprising a polymer. The methods described herein optionally utilize an aqueous fluid stock. In some applications, a water-based process is desirable, for instance if one wants to avoid potential health, environmental, or safety problems associated with organic solvents. As described herein, in some embodiments it is advantageous to electrospin a fluid stock that is homogenous. In some embodiments, the fluid stock is homogenous (e.g., which comprises a water-soluble polymer)

Electrospinning

In some embodiments, the process comprises electrospinning a fluid stock. Any suitable method for electrospinning is used. In some instances, elevated temperature electrospinning is utilized. Exemplary methods for comprise methods for electrospinning at elevated temperatures as disclosed in U.S. Pat. No. 7,326,043 and U.S. Pat. No. 7,901,610, which are incorporated herein for such disclosure. In some embodiments, elevated temperature electrospinning improves the homogeneity of the fluid stock throughout the electrospinning process. In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any method known to those skilled in the art.

In some embodiments, electrospinning is achieved by electrospinning a fluid stock through a nozzle apparatus, the nozzle apparatus having an inner needle and an outer needle (e.g., wherein the inner and outer needles are arranged concentrically or along a common axis). In some embodiments, the fluid stock is electrospun through the inner needle, while the outer needle provides a gas, e.g., so as to provide gas assistance to the electrospinning process. In some embodiments, the inner needle has any suitable inner diameter, such as 0.05 to 1 mm (and, e.g., an outer diameter of 0.2 to 1.5 mm), and the outer needle having any suitable inner diameter (which is greater than the outer diameter of the inner needle), such as 0.7 to 2 mm. The gas applied to, or provided by, the outer needle has any suitable velocity, such as 50 m/s to 1,000 m/s, or 200 m/s to 500 m/s. The flow rate of any fluid stock provided herein (e.g., to the inner needle) is any suitable rate (e.g., the rate may be much higher with common axial gas assistance than would otherwise be possible) $1 \times 10^{-11}$ to $1 \times 10^{-9}$ m/s. Any suitable charge is applied to the nozzle apparatus (e.g., to the inner needle) and/or the collector. For example, a change of +5 kV to +30 kV (e.g., about +20 kV) is optionally applied to the collector. Further, any suitable distance between the nozzle apparatus and the collector is optionally utilized (e.g., 5-25 cm, about 10 cm, or the like).

In specific embodiments, the process comprises coaxial electrospinning (electrospinning two or more fluids about a common axis). As described herein, coaxial electrospinning a first fluid stock as described herein (i.e., comprising a metal reagent component and a polymer) with a second fluid is used to add coatings, make hollow nanofibers, make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning). In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock having the characteristics as described herein (i.e., comprising a polymer and metal reagent component according to the instant disclosure).

Figure 2:
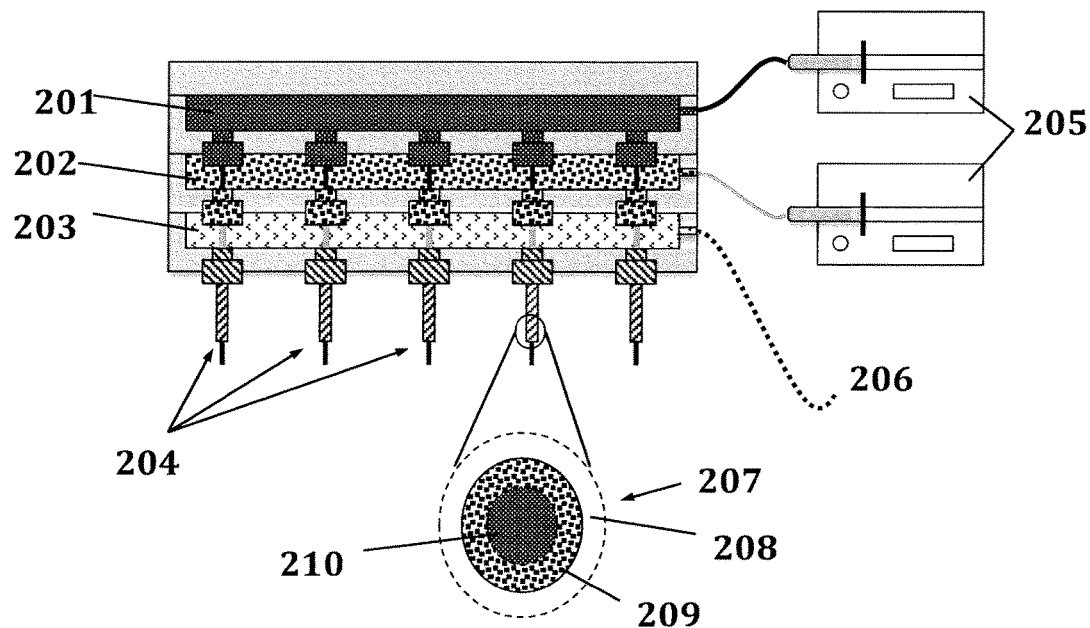
FIG. 2 illustrates a coaxial electrospinning apparatus useful for producing nanofibers described herein.
Figure 9:
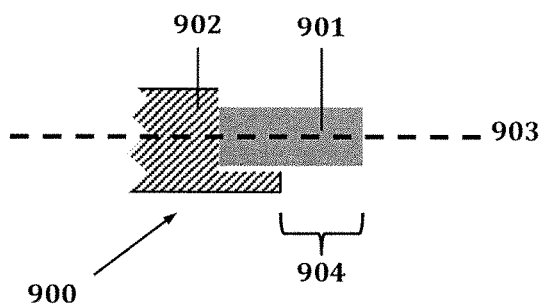
FIG. 9 illustrates co-axial electrospinning apparatus with an inner and outer needle.

FIG. 2 illustrates an exemplary schematic of a process or apparatus described herein, particularly for preparing a layered nanocomposite nanofiber by a coaxial gas assisted electrospinning process. In some instances, a first fluid stock 201 (e.g., comprising a metal reagent component and a polymer), is electrospun with an optional second fluid stock 202 (e.g., comprising a second metal precursor and a second polymer, the second precursor and polymer independently being either the same or different from the first), and a third fluid (e.g., gas) 203. The fluid stocks may be provided to the apparatus by any device, e.g., by a syringe 205. And the gas may be provided from any source 206 (e.g., air pump). In some embodiments such an apparatus comprises a plurality of co-axial needles 204. Exemplary needles, as illustrates by the cross section 207, comprise an outer sheath tube 208 (e.g., having a supply end and a nozzle end), at least one intermediate tube 209 (e.g., having a supply end and a nozzle end), and a core tube 210 (e.g., having a supply end and a nozzle end). In specific instances, each of the tubes are coaxially aligned (i.e., aligned along the substantially same axis). In certain embodiments, such a process may be utilized to prepare a nanofiber comprising a core and a layer. In some embodiments, the intermediate tube may be absent and a fluid stock may be electrospun in a gas-assisted manner (i.e., the sheath tube provides a high velocity gas). In other embodiments, the fluid stock may be electrospun from the sheath tube, the intermediate tube may be absent and the gas may be provided from the core tube (e.g., to produce a hollow nanofiber, which may be further treated/processed according to the techniques described herein to produce a hollow carbonaceous nanofiber). In some instances, the tube or nozzle end of any tube (e.g., any tube providing a fluid stock is) heated or capable of being heated. In some instances, heating of the nozzle provides for improved electrospinning performance and/or electrospun nanofiber morphology. FIG. 9 illustrates co-axial electrospinning apparatus 900. The coaxial needle apparatus comprises an inner needle 901 and an outer needle 902, both of which needles are coaxially aligned around a similar axis 903 (e.g., aligned with 5 degrees, 3 degrees, 1 degree, or the like). In some embodiments, further coaxial needles may be optionally placed around, inside, or between the needles 901 and 902, which are aligned around the axis 903. In some instances, the termination of the needles is optionally offset 904.

Figure 10:
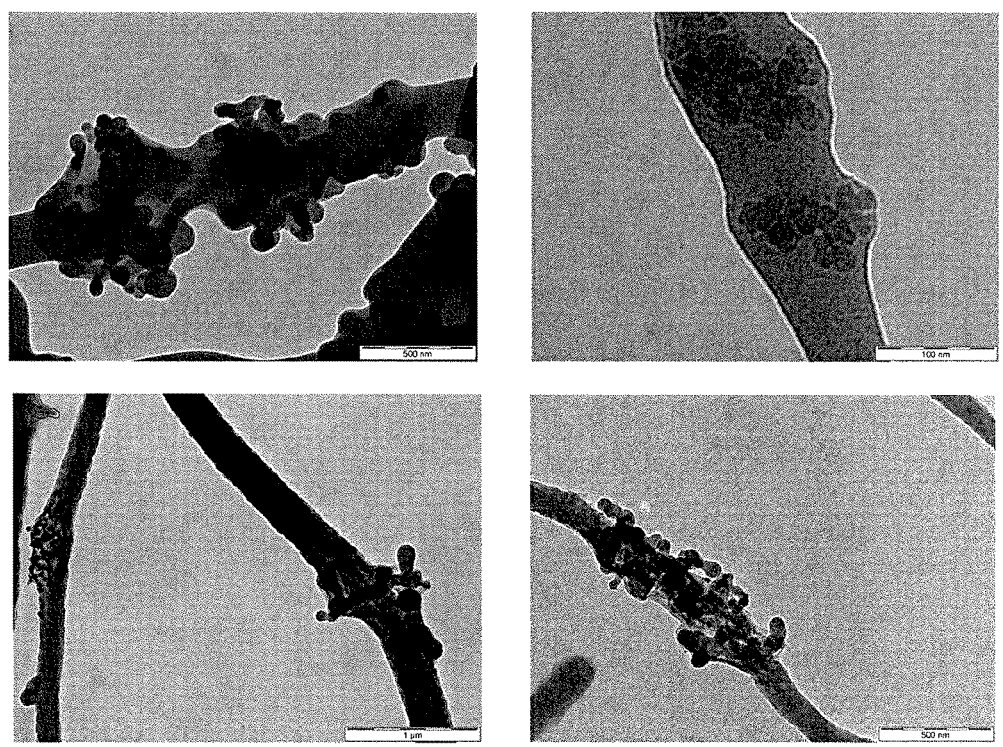
FIG. 10 illustrates TEM images of nanofibers prepared without the use of gas-assisted electrospinning techniques described herein.

In some embodiments provided herein is a process (e.g., using a needle as illustrated in FIG. 9) or product prepared by such a process, the process comprising gas assisted electrospinning a fluid stock to form electrospun nanofibers, the fluid stock comprising (i) a plurality of nanoparticles, and (ii) a polymer, the nanofibers comprising a continuous polymer matrix with non-aggregated nanoparticles embedded therein. In specific embodiments, the process further comprises treating (e.g., thermally and/or chemically treating) the electrospun nanofibers (which are optionally pre-treated) to produce carbonaceous nanofibers (e.g., nanofibers comprising a continuous metal carbide matrix or nanofiber comprising a continuous carbon matrix with metal component domains (e.g., nanoparticles—such as ceramic, metal oxide or elemental metal nanoparticles) embedded therein). In certain embodiments provided herein is a process (e.g., using a needle as illustrated in FIG. 9) or product prepared by such a process, the process comprising gas assisted electrospinning a fluid stock to form electrospun nanofibers, the fluid stock comprising (i) a metal component (e.g., a plurality of nanoparticles or metal precursor), and (ii) a polymer, and (b) thermally treating the electrospun nanofibers to produce carbonaceous nanofibers, the carbonaceous nanofibers comprising a continuous matrix (e.g., carbon matrix if thermally treated in an inert environment, such as with non-aggregated nanoparticle embedded therein; or a metal carbide if thermally treated at a temperature of at least 1000 C, such as with a suitable metal precursor is present in the fluid stock—particularly if this or an additional thermal treatment with air is utilized). In specific embodiments, the gas assistance is coaxial gas assistance. In some embodiments, the nanoparticles are non-aggregated in the fluid stock. In certain instances, gas assistance of the electrospinning of a nano-particle containing fluid stock increases fluid throughput and reduces or prevents nanoparticle aggregation in the needle apparatus, thereby reducing or preventing nanoparticle aggregation in the electrospun fiber. For example, FIG. 1 illustrates a nanofiber 100 comprising nanoparticles 101 embedded within a carbon matrix 102, the nanoparticles being non-aggregated. Conversely, as illustrated in FIG. 10, which nanofibers were prepared in the absence of gas assistance, nanoparticle aggregation is observed. In specific embodiments, the nanofibers comprises less than 50% of nanoparticles that are aggregated. In specific embodiments, the nanofibers comprises less than 40% of nanoparticles that are aggregated. In specific embodiments, the nanofibers comprises less than 25% of nanoparticles that are aggregated. In specific embodiments, the nanofibers comprises less than 10% of nanoparticles that are aggregated. In specific embodiments, the nanofibers comprises less than 5% of nanoparticles that are aggregated.

In some embodiments, an electrospinning process described herein comprises dispersing and/or maintaining the dispersion of the fluid stock (e.g., uniformly dispersed or homogenously dispersed). In some embodiments, to achieve or maintain dispersion, the fluid stock is heated and/or agitated (e.g., by stirring, mixing, sonicating, vortexing, or like techniques). In some embodiments, the procedure for forming the nanofiber is not electrospinning. Other methods, such as sol-gel techniques, interfacial polymerization, "fast mixing" techniques, electrospraying techniques, and the like may optionally be utilized to prepare nanofibers and/or other nanostructures using the materials (e.g., fluid stocks) described herein.

Nanofibers

In certain embodiments, provided herein nanofibers having any one or more of the characteristics herein disclosed, nanofibers prepared according to the methods described herein, and nanofibers preparable by the methods described herein. Also provided herein are processes for using the nanofibers, devices comprising the nanofibers and the like.

Provided in certain embodiments herein are carbonaceous nanofibers having a high metal content. In some embodiments, the carbonaceous nanofibers comprise metal carbide (e.g., a continuous matrix of metal carbide—such as crystalline metal carbide). In some embodiments, the metal carbide formed is a continuous matrix of metal carbide, such as crystalline metal carbide. In specific embodiments, such as illustrated in FIG. 8, such metal carbide matrices are crystalline (e.g., the nanofibers comprise a continuous matrix of crystalline metal carbide), such as having rhombohedral or cubic lattice structures. In some embodiment, the carbonaceous nanofibers comprise (i) a metal component, and (ii) a continuous carbon matrix (e.g., amorphous carbon). In certain embodiments, the continuous carbon matrix is a continuous core carbon matrix (e.g., not a hollow carbon tube). In some embodiments, the metal component makes up discrete isolated domains of the carbonaceous nanofibers. In some specific embodiments, the metal component comprises metal, metal oxide, ceramic, or a combination thereof.

In some embodiments, the domains have various sizes, for example about 1 nm, about 5 nm, about 10 nm, about 15 nm, about 20 nm, about 25 nm, about 30 nm, about 40 nm, about 50 nm, about 70 nm, about 90 nm, and the like. In some embodiments, the domains are at least about 1 nm, at least about 5 nm, at least about 10 nm, at least about 15 nm, at least about 20 nm, at least about 25 nm, at least about 30 nm, at least about 40 nm, at least about 50 nm, at least about 70 nm, at least about 90 nm, and the like in size. In some embodiments, the domains are at most about 1 nm, at most about 5 nm, at most about 10 nm, at most about 15 nm, at most about 20 nm, at most about 25 nm, at most about 30 nm, at most about 40 nm, at most about 50 nm, at most about 70 nm, at most about 90 nm, and the like in size. In some embodiments, the domains have a size between about 1 nm and 100 nm, between about 20 nm and 30 nm, between about 1 nm and 20 nm, between about 30 nm and 90 nm, between about 40 nm and 70 nm, between about 15 nm and 40 nm, and the like.

In some embodiments, the nanofibers have few defects and/or voids. In some instances a voids and defects in the nanofiber include breaks in the nanofiber, regions of nanofiber wherein the diameter is so narrow as to be easily broken (e.g., having a diameter of less than 10% or less than 5% of the average nanofiber diameter), regions of the nanofiber wherein the nanofiber material has anomalous morphologies (e.g., crystalline domains in a substantially amorphous nanofiber—such crystalline domains may increase fracturing and brittleness of the nanofiber), and the like. In some embodiments, there are about 1, about 5, about 10, about 50, about 100, and the like defects per linear mm of nanofiber. In some embodiments, there are at most about 1, at most about 5, at most about 10, at most about 50, at most about 100, and the like defects per linear mm of nanofiber. In other embodiments, the nanofibers have fewer defects and/or voids, wherein the number of defects and/or voids in the nanofiber is in comparison to a nanofiber not produced by the methods of the disclosure (for example with a low loading of precursor).

Provided in various embodiments herein are carbonaceous nanofibers comprising high metal and carbon content (e.g., carbonaceous nanofibers comprising a carbon matrix and domains of metal or metal carbide nanofibers). In some embodiments, nanofibers provided herein comprise at least 99%, at least 98%, at least 97%, at least 96%, at least 95%, at least 90%, at least 80%, or the like of metal and carbon, when taken together, by mass (e.g., elemental mass). In some embodiments, carbonaceous nanofibers provided herein comprise at least 50%, at least 60%, at least 70%, or at least 75% metal by mass (e.g., elemental mass).

In some embodiments, nanofibers provided herein comprise less than 5% oxygen by mass. In certain embodiments, nanofibers provided herein comprise less than 3% oxygen by mass. In specific embodiments, nanofibers provided herein comprise less than 2% oxygen by mass. In more specific embodiments, nanofibers provided herein comprise less than 2% oxygen by mass. In still more specific embodiments, nanofibers provided herein comprise less than 0.5% oxygen by mass.

Provided in certain embodiments herein are carbonaceous nanofibers comprising high metal, oxygen and carbon content (e.g., carbonaceous nanofibers comprising a carbon matrix and domains of metal oxide). In some embodiments, nanofibers provided herein comprise at least 99%, at least 98%, at least 97%, at least 96%, at least 95%, at least 90%, at least 80%, or the like of metal, oxygen and carbon, when taken together, by mass (e.g., elemental mass). In some embodiments, carbonaceous nanofibers provided herein comprise at least 20%, at least 30%, at least 40%, or at least 50% metal by mass (e.g., elemental mass). In some embodiments, carbonaceous nanofibers provided herein comprise at least 50%, at least 60%, at least 70%, or at least 75% metal oxide by mass (e.g., elemental mass).

In some embodiments, the nanofibers comprise a single metal type. In other embodiments, the metal nanofibers comprise two or more metal types. In some embodiments, provided herein are nanofibers comprising two or more metals and the metals are in the form of an alloy. The metal of the metal, metal oxide, ceramic, or metal carbide provided here is any suitable metal, including: transition metal, alkali metal, alkaline earth metal, post-transition metal, lanthanide, or actinide. Suitable transition metals include: scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), and hasium (Hs). Suitable alkali metals include: lithium (Li), sodium (Na), potassium (K), rubidium (Rb), cesium (Cs) and francium (Fr). Suitable alkaline earth metals include: beryllium (Be), magnesium (Mg), calcium (Ca), strontium (Sr), barium (Ba), and radium (Ra). Suitable post-transition metals include: aluminum (Al), gallium (Ga), indium (In), tin (Sn), thallium (Tl), lead (Pb), and bismuth (Bi). Suitable lanthanides include the elements with atomic number 57 to 71 on the periodic table. Suitable actinides include the elements with atomic number 89 to 103 on the periodic table. In some embodiments, the metal is a metalloid, such as, germanium (Ge), antimony (Sb) and polonium (Po), or silicon (Si). Exemplary ceramics or metal oxides include but are not limited to $Al_2O_3$, $ZrO_2$, $Fe_2O_3$, CuO, NiO, ZnO, CdO, $SiO_2$, $TiO_2$, $V_2O_5$, $VO_2$, $Fe_3O_4$, SnO, $SnO_2$, CoO, $CoO_2$, $Co_3O_4$, $HfO_2$, $BaTiO_3$, $SrTiO_3$, and $BaSrTiO_3$. Methods for producing nanofibers comprising a metal oxide are disclosed herein and optionally include treatment under oxidizing conditions. In some embodiments, the ceramic and metal oxide comprise a single metal type. In other embodiments, the ceramic and metal oxide of the metal component comprise a two or more metal types (e.g., BaTiO3, SrTiO3, BaSrTiO3 (e.g., Ba0.55Sr0.45TiO3), and the like).

As described herein, certain carbonaceous nanofibers provided herein comprise a continuous carbon matrix (e.g., a continuous core carbon matrix). In some embodiments, the matrix segment or segments within the nanofiber continue along a substantial portion of the nanofiber. In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some instances, the continuous matrix runs along at least 50% the length of the nanofiber (e.g., on average for populations of nanofibers). In specific instances, the continuous matrix runs along at least 70% the length (e.g., on average) of the nanofiber(s). In more specific instances, the continuous matrix runs along at least 80% the length (e.g., on average) of the nanofiber(s). In still more specific embodiments, the continuous matrix runs along at least 90% of the length (e.g., on average) of the nanofiber(s). In yet more specific embodiments, the continuous matrix runs along at least 95% of the length (e.g., on average) of the nanofiber(s).

In some embodiments, provided herein are carbonaceous nanofibers comprising a hollow core (e.g., a metal carbide nanofiber, or a carbon matrix nanofiber comprising discrete, isolated domains of a metal component). The hollow core of the nanofiber has any suitable diameter. In some embodiments, the diameter of the hollow core is on average between about 1 nm and 1000 nm, between about 1 nm and 500 nm, between about 5 nm and 250 nm, between about 10 nm and 200 nm, or the like.

In one aspect, the nanofibers described herein are unique compositions of matter, having never before been described. In one aspect, described herein are nanofibers having certain novel properties. In various embodiments, these nanofibers have certain dimensions, aspect ratios, specific surface areas, porosities, conductivities, flexibilities, and the like that are beyond what was previously achievable. In some embodiments, the nanofibers described herein offer improvement upon devices that comprise the nanofibers.

In some embodiments, certain applications favor smaller diameter nanofibers (e.g., which are achieved without sacrificing quality by practicing the methods described herein). For example, gas-assisted electrospinning techniques are utilized to create thin nanofibers (i.e., by accelerating the jet stream of fluid stock leaving the electrospinner). In some instances, carbonaceous nanofibers described herein have a smaller diameter than the diameter of the electrospun precursor nanofibers. Therefore, in some instances, it is desirable to electrospin precursor nanofibers having a larger diameter than the diameter desired for the final carbonaceous nanofiber. Methods for measuring the diameter of a nanofiber include, but are not limited to microscopy, optionally transmission electron microscopy ("TEM") or scanning electron microscopy ("SEM").

Figure 15:
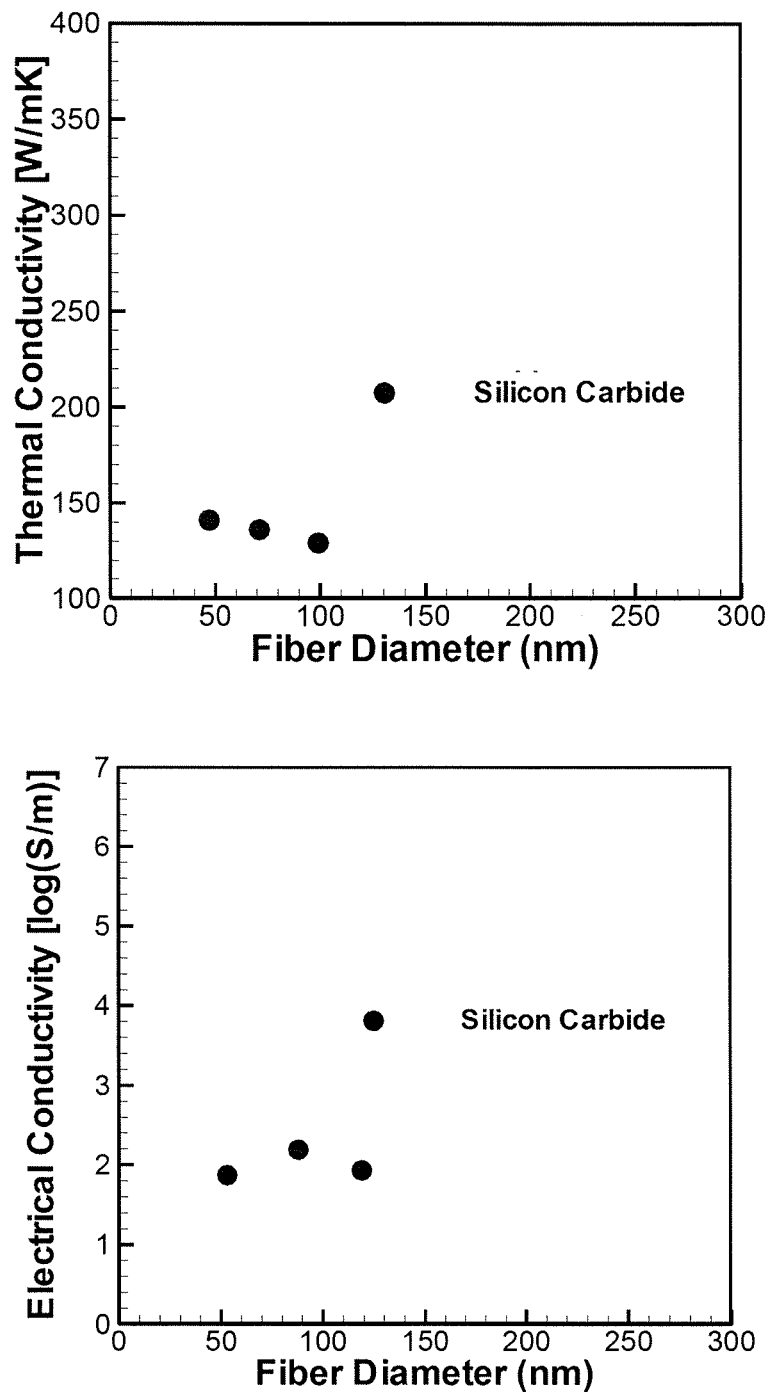
FIG. 15 illustrates electrical and thermal conductivities of metal carbide nanofibers at various fiber diameters.

In various embodiments, provided herein are nanofibers or processes for producing nanofibers having any suitable diameter. In some embodiments, a given collection of nanofibers comprise nanofibers that have a distribution of fibers of various diameters. In some embodiments, a single nanofiber has a diameter that varies along its length. In some embodiments, certain fibers of a population or portions of a fiber exceed or fall short of the average diameter. In some embodiments, carbonaceous nanofibers provided herein have on average a diameter of about 20 nm, about 30 nm, about 40 nm, about 50 nm, about 60 nm, about 70 nm, about 80 nm, about 90 nm, about 100 nm, about 130 nm, about 150 nm, about 200 nm, about 250 nm, about 300 nm, about 400 nm, about 500 nm, about 600 nm, about 700 nm, about 800 nm, about 900 nm, about 1,000 nm, about 1,500 nm, about 2,000 nm and the like. In some embodiments, the nanofiber has on average a diameter of at most 20 nm, at most 30 nm, at most 40 nm, at most 50 nm, at most 60 nm, at most 70 nm, at most 80 nm, at most 90 nm, at most 100 nm, at most 130 nm, at most 150 nm, at most 200 nm, at most 250 nm, at most 300 nm, at most 400 nm, at most 500 nm, at most 600 nm, at most 700 nm, at most 800 nm, at most 900 nm, at most 1,000 nm, at most 1,500 nm, at most 2,000 nm and the like. In some embodiments, the nanofiber has on average a diameter of at least 20 nm, at least 30 nm, at least 40 nm, at least 50 nm, at least 60 nm, at least 70 nm, at least 80 nm, at least 90 nm, at least 100 nm, at least 130 nm, at least 150 nm, at least 200 nm, at least 250 nm, at least 300 nm, at least 400 nm, at least 500 nm, at least 600 nm, at least 700 nm, at least 800 nm, at least 900 nm, at least 1,000 nm, at least 1,500 nm, at least 2,000 nm and the like. In yet other embodiments, the nanofiber has on average a diameter between about 50 nm and about 300 nm, between about 50 nm and about 150 nm, between about 100 nm and about 400 nm, between about 100 nm and about 200 nm, between about 500 nm and about 800 nm, between about 60 nm and about 900 nm, and the like. In specific embodiments, carbonaceous nanofibers provided herein have a (e.g., average) diameter of less than 1500 nm. In more specific embodiments, carbonaceous nanofibers provided herein have a (e.g., average) diameter of 100 nm to 1000 nm. In some embodiments, carbonaceous nanofibers provided herein have a (e.g., average) diameter of 500 nm or less. In some embodiments, carbonaceous nanofibers provided herein have a (e.g., average) diameter of 400 nm or less. In some embodiments, carbonaceous nanofibers provided herein have a (e.g., average) diameter of 200 nm to 500 nm. In other specific embodiments, precursor nanofibers described herein have a (e.g., average) diameter of less than 2000 nm. In more specific embodiments, electrospun precursor nanofibers described herein have a (e.g., average) diameter of 300 nm to 1500 nm. In specific embodiments, nanofibers have a diameter of at least 100 nm (e.g., 100 nm to 1 micron). For example, FIG. 15 illustrates improved electrical conductivity and thermal conductivity for metal carbide nanofibers above 100 nm.

In some embodiments, the nanofiber is long. In some instances, the methods of the present disclosure produce long nanofibers (e.g., because the high loading and uniform distribution of precursor creates nanofibers that are highly "continuous" or "coherent", meaning that they have few defects). In some embodiments, such high quality nanofibers are statistically more likely to be long because the probability is reduced that there is a defect along any particular length that is severe enough to define an end of the nanofiber. Methods for measuring the length of a nanofiber include, but are not limited to microscopy, optionally transmission electron microscopy ("TEM") or scanning electron microscopy ("SEM").

The nanofibers have any suitable length. In some instances, a given collection of nanofibers comprise nanofibers that have a distribution of fibers of various lengths. In some embodiments, certain fibers of a population exceed or fall short of the average length. In some embodiments, carbonaceous nanofibers provided herein have an average length of about 20 µm, about 50 µm, about 100 µm, about 500 µm, about 1,000 µm, about 5,000 µm, about 10,000 µm, about 50,000 µm, about 100,000 µm, about 500,000 µm, and the like. In some embodiments, carbonaceous nanofibers provided herein have an average length of at least about 20 µm, at least about 50 µm, at least about 100 µm, at least about 500 µm, at least about 1,000 µm, at least about 5,000 µm, at least about 10,000 µm, at least about 50,000 µm, at least about 100,000 µm, at least about 500,000 µm, and the like.

The carbonaceous nanofibers provided herein have any suitable aspect ratio (nanofiber length divided by diameter). In some embodiments, the carbonaceous nanofibers provided herein have an aspect ratio (e.g., average aspect ratio) of at least 10, at least $10^2$, at least $10^3$, at least $10^4$, at least $10^5$, at least $10^6$, at least $10^7$, or the like. In some embodiments, the nanofiber is of substantially infinite length and has an aspect ratio of substantially infinity. In specific embodiments, the aspect ratio (e.g., average aspect ratio) of nanofibers provided herein is at least 100. In more specific embodiments, the aspect ratio (e.g., average aspect ratio) of nanofibers provided herein is at least 1,000 (e.g., at least 5,000). In still more specific embodiments, the aspect ratio (e.g., average aspect ratio) of nanofibers provided herein is at least 10,000. In some instances, aspect ratio is a useful metric for quantifying the coherence of a nanofiber, with higher aspect ratios indicating that a nanofiber or population of nanofibers have few voids or defects. In some embodiments, aspect ratio refers to a single nanofiber. In some embodiments, aspect ratio refers to a plurality of nanofibers and is reported as a single average value (i.e., the aspect ratio being the average length of the nanofibers of a sample divided by their average diameter). In some instances, diameters and/or lengths are measured by microscopy.

The "specific surface area" is the surface area per mass or volume one of a fiber (or an average of a plurality of fibers). In various instances, the specific surface area is calculated based on a single nanofiber, or based on a collection of nanofibers and reported as a single average value. Techniques for measuring mass are known to those skilled in the art. In some instances, the surface area is calculated by measuring the diameter and length of nanofiber in the sample and applying the equation for the surface area of a cylinder (i.e., 2 times pi times half of the diameter of the nanofiber times the sum of the length of the nanofiber and half of the diameter of the nanofiber). In some instances, the surface area is measured by physical or chemical methods, for example by the Brunauer-Emmett, and Teller (BET) method where the difference between physisorption and desorption of inert gas is utilized. In some embodiments, the surface area is measured by titrating certain chemical groups on the nanofiber to estimate the number of groups on the surface, which is related to the surface area by a previously determined titration curve. Those skilled in the art of chemistry will be familiar with methods of titration.

The carbonaceous nanofibers provided herein have any suitable specific surface area (surface area divided by mass (or volume)). In some embodiments, the specific surface area of carbonaceous nanofibers provided herein is at least 0.1 $m^2/g$, at least 1 $m^2/g$, at least 5 $m^2/g$, at least 10 $m^2/g$, at least 50 $m^2/g$, at least 100 $m^2/g$, at least 200 $m^2/g$, at least 500 $m^2/g$, at least 1,000 $m^2/g$, at least 1,500 $m^2/g$, at least 2,000 $m^2/g$, or the like.

In some instances, methods disclosed herein (e.g., including using a high loading of uniformly distributed precursor) reduce the number and size of pores. Porosity is also called "void fraction" and is a measure of the void spaces in a material. In some embodiments, porosity is a fraction of the volume of voids over the total volume and is reported as a percentage between 0% and 100%. In various embodiments, the porosity depends on many factors including loading and distribution of precursor in the fluid stock, calcination conditions, and the like. The nanofibers have any suitable porosity. In some embodiments, the porosity is at least 1%, at least 5%, at least 10%, at least 20%, at least 25%, at least 50%, at most 1%, at most 5%, at most 10%, at most 25%, at most 50%, or the like. In some embodiments, the porosity is between about 1% and 50%, between about 5% and 20%, or the like.

In certain embodiments, nanofibers provided herein have improved performance over other nano-materials. In some instances, Young's modulus, fracture toughness, ultimate strength, electrical conductivity, thermal conductivity, flexibility, and/or other characteristics of the nanofibers described herein (and/or their composite materials) are improved over other nanostructures of the same material and/or over the bulk/sheet form of the same material. Table 1 illustrates the physical properties of certain nanofibers provided herein and the physical properties of bulk materials having similar structure.

TABLE 1

| Material | Youngs Modulus (GPa) | | Fracture Toughness (MPa · $m^{1/2}$) | Ultimate Strength (MPa) | | Electrical Conductivity (log(S/m)) | |
| --- | --- | --- | --- | --- | --- | --- | --- |
| | nano | bulk | | nano | bulk | nano | bulk |
| SiC | 1030 | 450 | 3.88 | 8120 | 3440 | 2.2 | 4.0 |

In some embodiments, nanofibers described herein have improved Young's modulus over similar materials in other nanostructure or bulk forms. In some instances, provided herein are nanofibers having a mean or median nanofiber Young's modulus-to-diameter ratio of at least 0.1 GPa/nm. In certain instances, provided herein are nanofibers having a mean or median nanofiber Young's modulus-to-diameter ratio of at least 0.5 GPa/nm. In specific instances, provided herein are nanofibers having a mean or median nanofiber Young's modulus-to-diameter ratio of at least 1 GPa/nm. In more specific instances, provided herein are nanofibers having a mean or median nanofiber Young's modulus-to-diameter ratio of at least 2 GPa/nm. In still more specific instances, provided herein are nanofibers having a mean or median nanofiber Young's modulus-to-diameter ratio of at least 3 GPa/nm. In yet more specific instances, provided herein are nanofibers having a mean or median nanofiber Young's modulus-to-diameter ratio of at least 4 GPa/nm. In specific instances, provided herein are nanofibers having a mean or median nanofiber Young's modulus-to-diameter ratio of at least 5 GPa/nm. In some instances, provided herein are nanofibers having a mean or median nanofiber Young's modulus-to-diameter ratio of at least 0.05 GPa/nm or at least 10 GPa/nm.

In some embodiments, nanofibers described herein have improved fracture toughness over similar materials in other nanostructure or bulk forms. In some instances, provided herein are nanofibers having a mean or median nanofiber fracture toughness-to-diameter ratio of at least 1 MPa/nm. In certain instances, provided herein are nanofibers having a mean or median nanofiber fracture toughness-to-diameter ratio of at least 5 MPa/nm. In specific instances, provided herein are nanofibers having a mean or median nanofiber fracture toughness-to-diameter ratio of at least 10 MPa/nm. In more specific instances, provided herein are nanofibers having a mean or median nanofiber fracture toughness-to-diameter ratio of at least 15 MPa/nm. In still more specific instances, provided herein are nanofibers having a mean or median nanofiber fracture toughness-to-diameter ratio of at least 20 MPa/nm. In yet more specific instances, provided herein are nanofibers having a mean or median nanofiber fracture toughness-to-diameter ratio of at least 30 MPa/nm. In specific instances, provided herein are nanofibers having a mean or median nanofiber Young's modulus-to-diameter ratio of at least 40 MPa/nm. In some instances, provided herein are nanofibers having a mean or median nanofiber Young's modulus-to-diameter ratio of at least 0.1 MPa/nm or at least 50 MPa/nm.

In some embodiments, the average electrical conductivity of a nanofiber provided herein has a log(S/m) to log(S/m) ratio with an identical bulk material of at least 0.3 (i.e., log of the electrical conductivity along the length of the nanofiber divided by log of the electrical conductivity of the same material, in bulk—e.g., sheet form). In specific embodiments, the average electrical conductivity of a nanofiber provided herein has a log(S/m) to log(S/m) ratio with an identical bulk material of at least 0.4. In more specific embodiments, the average electrical conductivity of a nanofiber provided herein has a log(S/m) to log(S/m) ratio with an identical bulk material of at least 0.5. In still more specific embodiments, the average electrical conductivity of a nanofiber provided herein has a log(S/m) to log(S/m) ratio with an identical bulk material of at least 0.55. In certain embodiments, the average electrical conductivity of a nanofiber provided herein is at least 1 log(S/m), at least 1.5 log(S/m), at least 2 log(S/m), or the like. In some embodiments, a nanofiber provided herein has a conductivity of at least about 5%, at least about 10%, at least about 20%, at least about 30%, at least about 40%, at least about 50%, or the like when compared with the conductivity of the material when formed into a sheet. The nanofibers have any suitable electrical conductivity. In various embodiments, electrical conductivity is measured as an average value, at a specific condition, or along a specific direction of the nanofiber sample. In some embodiments, the conductivity at least 1 S/cm, at least 10 S/cm, at least 100 S/cm, at least $10^3$ S/cm, at least $10^4$ S/cm, or the like.

In some instances, conductivity is reported without reference to the conductivity of the material when formed into a sheet. For example in some embodiments, electrical conductivity is reported on an absolute, rather than relative basis. Electrical conductivity is measured by any suitable method known to those skilled in the art. For example in some embodiments, conductivity is measured by first measuring the resistance and calculating the reciprocal. In one instance, one hooks up a sample of nanofibers to be tested to a voltage source and measures the current going through the sample and the voltage across the sample. In some instances, the resistance is calculated from Ohm's law (i.e., $R=E/I$ where R is resistance in ohms, E is voltage in volts and I is current in amperes). Once one has resistance, one can calculate resistivity. Resistivity is a factor, which when multiplied by the length of the sample and divided by its cross-sectional area, yields the resistance. Conductivity is the reciprocal of the resistivity.

In some embodiments, the nanofibers or collections of nanofibers of the present disclosure are flexible. In some instances, flexible nanofibers are advantageous in applications such as in the manufacture of flexible solar panels. In some instances, flexibility is quantified by the Young's modulus, which is the slope of the initial linear portion of a stress-strain curve. The Young's modulus has units of pressure, such as mega Pascals (MPa). In some embodiments, flexibility is different along different directions of the material, so may be reported with respect to a certain direction, or is reported as an average value. The nanofibers have any suitable flexibility. In some embodiments, the nanofiber has a Young's modulus of at least 10 MPa, at least 100 MPa, at least 250 MPa, at least 500 MPa, at least 1,000 MPa, at least 4,000 MPa, at least 6,000 MPa, at least 8,000 MPa, or the like.

In some embodiments, nanofibers (e.g., metal carbide nanofibers) described herein have an electrical conductivity at least as great as that illustrated in FIG. 15. In further embodiments, nanofibers (e.g., metal carbide nanofibers) described herein have an electrical conductivity as a function of fiber diameter (e.g., [log(S/m)] per nm of fiber diameter) at least as great as illustrated in FIG. 15. In some embodiments, nanofibers (e.g., metal carbide nanofibers) described herein have an electrical conductivity at least as great as 50% (e.g., at least 75%, at least 80%, at least 90%) of that illustrated in FIG. 15. In further embodiments, nanofibers (e.g., metal carbide nanofibers) described herein have an electrical conductivity as a function of fiber diameter (e.g., [log(S/m)] per nm of fiber diameter) at least as great as 50% (e.g., at least 75%, at least 80%, at least 90%) illustrated in FIG. 15. In some embodiments, nanofibers (e.g., metal carbide nanofibers) described herein have an electrical conductivity of at least 2.2 log(S/m), or at least at least 3 log(S/m), or at least 3.5 log(s/m). In some embodiments, nanofibers (e.g., metal carbide nanofibers) described herein have an electrical conductivity of at least 2.2 log(S/m)

per 50 nm nanofiber diameter, or at least at least 3 log(S/m) per 130 nm nanofiber diameter, or at least 3.5 log(s/m) per 130 nm nanofiber diameter.

In some embodiments, nanofibers (e.g., metal carbide nanofibers) described herein have a thermal conductivity at least as great as that illustrated in FIG. 15. In further embodiments, nanofibers (e.g., metal carbide nanofibers) described herein have an thermal conductivity as a function of fiber diameter (e.g., [log(S/m)] per nm of fiber diameter) at least as great as illustrated in FIG. 15. In some embodiments, nanofibers (e.g., metal carbide nanofibers) described herein have a thermal conductivity at least as great as 50% (e.g., at least 75%, at least 80%, at least 90%) of that illustrated in FIG. 15. In further embodiments, nanofibers (e.g., metal carbide nanofibers) described herein have an thermal conductivity as a function of fiber diameter (e.g., [log(S/m)] per nm of fiber diameter) at least as great as 50% (e.g., at least 75%, at least 80%, at least 90%) illustrated in FIG. 15. In some embodiments, nanofibers (e.g., metal carbide nanofibers) described herein have a thermal conductivity of at 120 W/mK, or at least 200 W/mK. For example, in some embodiments, nanofibers (e.g., metal carbide nanofibers) described herein have an thermal conductivity of at least 120 W/mK per 50 nm nanofiber diameter, or at least 150 W/mK per 130 nm nanofiber diameter, or at least 200 W/mK per 130 nm nanofiber diameter (in other words, about 1.5 W/mK/nm diameter or more).

Figure 14:
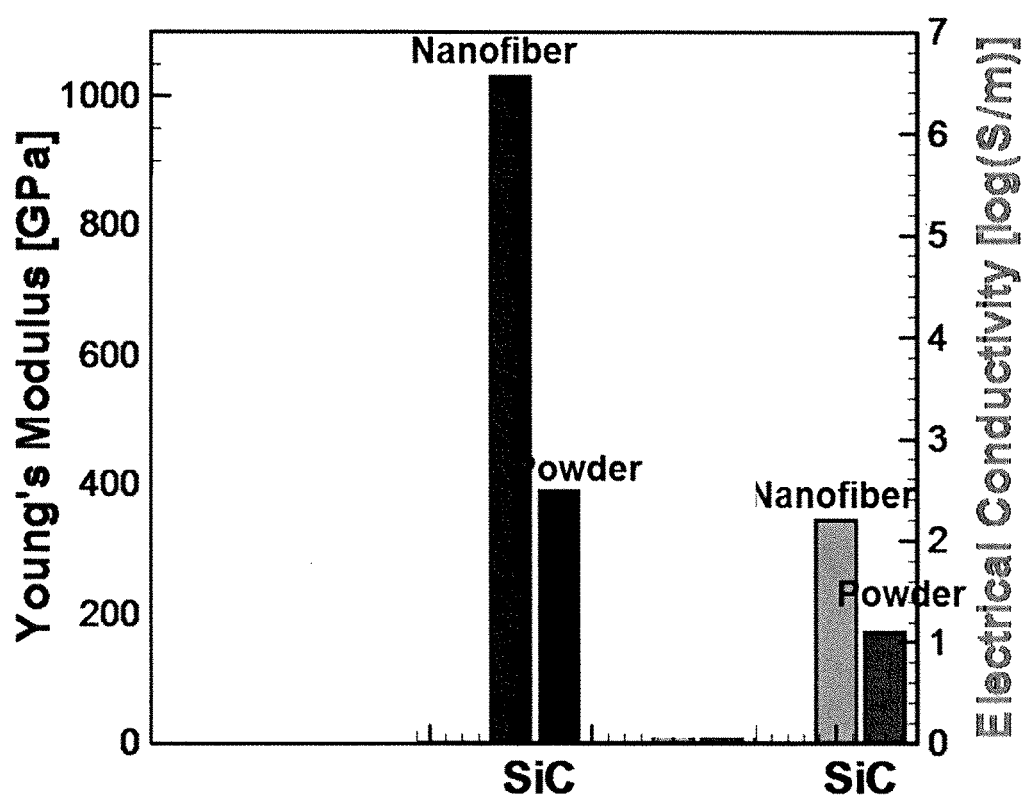
FIG. 14 illustrates comparisons of Young's modulus and electrical conductivity for silicon carbide powder compared to silicon carbide nanofibers.

In some embodiments, nanofibers (e.g., metal carbide nanofibers) described herein have a Young's modulus at least as great as that illustrated in FIG. 14. In some embodiments, nanofibers (e.g., metal carbide nanofibers) described herein have an electrical conductivity at least as great as that illustrated in FIG. 14. In some embodiments, nanofibers (e.g., metal carbide nanofibers) described herein have a Young's modulus at least as great as 50% (e.g., at least 75%, at least 80%, at least 90%) of that illustrated in FIG. 14. In some embodiments, nanofibers (e.g., metal carbide nanofibers) described herein have an electrical conductivity at least as great as 50% (e.g., at least 75%, at least 80%, at least 90%) of that illustrated in FIG. 14.

Nanofiber Mats

In some embodiments, the nanofibers described herein are collected or formed into any suitable structure (e.g., suitable for the desired application). Structures include, but are not limited to spheres, cones, cylinders, slabs, helixes, polygons, and the like. For simplicity of terminology, all possible shapes or assemblage of nanofibers are herein referred to as a "mat". In various embodiments, nanofiber mats comprise nanofibers of a single type, or nanofibers of at least two types (e.g., at least one carbonaceous nanofiber and another different type of nanofiber).

In some embodiments, coherent nanofibers lead to a mat having desirable properties (e.g., a less brittle nanofiber mat). In some instances, these desirable properties emerge from the properties of the component nanofibers and/or depend on the method in which the nanofibers are formed into the mat. In some embodiments, the present disclosure includes the nanofiber mats. In one aspect, described herein are nanofiber mats formed by and/or comprising nanofibers of the present disclosure. Also described herein are nanofiber mats prepared by any of the methods, or preparable by any of the methods in the present disclosure. In one aspect, described herein are methods for preparing nanofiber mats, optionally using an electrospinning process.

In some embodiments, nanofibers are collected in a given geometry as they are produced (e.g., by moving the collection plate relative to the spinnerets, i.e., 3-D printing). In various embodiments, nanofibers are formed into a given geometry after collection (optionally before calcination), or formed into a given geometry after treatment/carbonization (e.g., thermal treatment of the electrospun precursor nanofiber). In some instances, the nanofiber mat comprises nanofibers arranged in a controlled manner (e.g., on a mesh with a perpendicular lattice). In some embodiments, the nanofibers are arranged randomly. In various embodiments, the mats are patterned in any level of detail including different fibers of different types, laid in different directions, in contact with various other nanofibers or insulated from various other nanofibers, and the like. In some embodiments, the nanofibers are cross-linked and/or surface modified.

In various, the nanofiber mat has similar and/or different properties as the nanofibers from which it is comprised. For example, the mats may have similar and/or different of the following properties: porosity, specific surface area, conductivity (e.g., electrical or thermal), and the like. In some embodiments, the nanofiber mat is isotropic (has similar properties in all directions). In other embodiments, the nanofiber mat is anisotropic (has different properties in different directions). In some embodiments, the nanofiber mat is partially isotropic (i.e., for some properties) and partially anisotropic (i.e., for other properties). In embodiments where the mat is anisotropic, a given property differs in a second orientation or direction compared to a first orientation or direction by at least about 5%, at least about 10%, at least about 15%, at least about 20%, at least about 30%, at least about 40%, at least about 50%, at least about 60%, at least about 80%, at least about 100%, at least about 150%, at least about 200%, at least about 300%, at least about 400%, at least about 500%, and the like. In some embodiments, a given property is at least about 10 times, at least about 20 times, at least about 50 times, at least about 100 times, at least about 200 times, at least about 500 times, at least about 1,000 times, at least about 10,000 times, and the like higher in a second direction or orientation than in a first direction or orientation.

In some embodiments, the porosity of the mat is the combination of the spaces between the nanofiber strands and the pores within the nanofibers themselves. In some instances, microscopy is used to measure or estimate porosity. In other instances, the porosity of a nanofiber mat is determined by measuring the fluid volume present in the nanofiber mat after the nanofiber mat is submerged in or filled with a fluid. A nanofiber mat provided herein has any suitable porosity. In some embodiments, the porosity is at most 1%, at most 2%, at most 4%, at most 6%, at most 8%, at most 10%, at most 15%, at most 20%, at most 25%, at most 30%, at most 40%, at most 50%, at most 60%, at most 70%, at least 1%, at least 2%, at least 4%, at least 6%, at least 8%, at least 10%, at least 15%, at least 20%, at least 25%, at least 30%, at least 40%, at least 50%, at least 60%, at least 70%, or the like.

In some instances, porosity has units of length (or depth). The porous length is the distance between a point on a nanofiber strand and the nearest point on another nanofiber strand. In some instances, objects having a dimension longer than this porous length will not generally be able to pass through the mat. In some instances, the porous length is measured by bombarding the nanofiber mat with particles of a plurality of diameters until the particles of a certain size pass through the nanofiber mat, indicating that the nanofiber mat has a porous length approximately equal to the diameter of said particles. The pores of a nanofiber mat provided herein may have any suitable length. In some embodiments, the pores are at most about 0.1 microns, at most about 0.2 microns, at most about 0.5 microns, at most about 0.7 microns, at most about 1 microns, at most about 2 microns, at most about 4 microns, at most about 6 microns, at most about 8 microns, at most about 10 microns, at most about 15 microns, at most about 20 microns, at most about 30 microns, at most about 40 microns, at most about 50 microns, at most about 70 microns, at most about 100 microns, at most about 200 microns, at least about 0.1 microns, at least about 0.2 microns, at least about 0.5 microns, at least about 0.7 microns, at least about 1 microns, at least about 2 microns, at least about 4 microns, at least about 6 microns, at least about 8 microns, at least about 10 microns, at least about 15 microns, at least about 20 microns, at least about 30 microns, at least about 40 microns, at least about 50 microns, at least about 70 microns, at least about 100 microns, at least about 200 microns, or the like (e.g., on their longest dimension, or the shortest dimension).

In some embodiments, electrospun/precursor nanofibers (e.g., comprising a continuous polymer matrix) and/or carbonaceous nanofibers (e.g., comprising a continuous carbon matrix) comprise metal component domains (e.g., nanoparticles) that are uniformly distributed and/or are non-aggregated within the nanofiber matrix. In some instances, the standard deviation of the distances between a given metal component domain (e.g., nanoparticle) and the nearest domain (e.g., nanoparticle) to the given domain (e.g., domain) is about 50%, about 60%, about 70%, about 80%, about 100%, about 120%, about 140%, about 200%, and the like of the average of the distances (i.e., uniform distribution). In some instances, the standard deviation of the distances between a given domain and the nearest domain to the given domain is at most 50%, at most 60%, at most 70%, at most 80%, at most 100%, at most 120%, at most 140%, at most 200%, and the like of the average of the distances (i.e., uniform distribution).

In some embodiments, the domains (e.g., nanoparticles) are non-aggregated. In specific embodiments, less than 40% of the domains (e.g., nanoparticles) are aggregated (e.g., as measured in any suitable manner, such as by TEM). In specific embodiments, less than 30% of the domains are aggregated. In more specific embodiments, less than 25% of the domains are aggregated. In yet more specific embodiments, less than 20% of the domains are aggregated. In still more specific embodiments, less than 10% of the domains are aggregated. In more specific embodiments, less than 5% of the domains are aggregated.

Nanofiber mats provided herein may have any suitable density. In some embodiments, the mat has a density of about 0.01 g/cm$^3$, about 0.05 g/cm$^3$, about 0.1 g/cm$^3$, about 0.2 g/cm$^3$, about 0.4 g/cm$^3$, about 0.8 g/cm$^3$, about 1 g/cm$^3$, about 5 g/cm$^3$, about 10 g/cm$^3$, and the like. In some embodiments, the mat has a density of at least about 0.01 g/cm$^3$, at least about 0.05 g/cm$^3$, at least about 0.1 g/cm$^3$, at least about 0.2 g/cm$^3$, at least about 0.4 g/cm$^3$, at least about 0.8 g/cm$^3$, at least about 1 g/cm$^3$, at least about 5 g/cm$^3$, at least about 10 g/cm$^3$, and the like. In some embodiments, the mat has a density of at most about 0.01 g/cm$^3$, at most about 0.05 g/cm$^3$, at most about 0.1 g/cm$^3$, at most about 0.2 g/cm$^3$, at most about 0.4 g/cm$^3$, at most about 0.8 g/cm$^3$, at most about 1 g/cm$^3$, at most about 5 g/cm$^3$, at most about 10 g/cm$^3$, and the like. In some embodiments, the mat has a density of between about 0.01 g/cm$^3$ and 0.05 g/cm$^3$, between about 0.05 g/cm$^3$ and 0.3 g/cm$^3$, between about 0.1 g/cm$^3$ and 1 g/cm$^3$, between about 1 g/cm$^3$ and 5 g/cm$^3$, and the like. Similarly, nanofiber mats provided herein may have any suitable number of strands per area or volume. In some embodiments, the mat comprises at least about 5 strands, at least about 10 strands, at least about 50 strands, about 100 strands, at least about 150 strands, at least about 250 strands, at least about 500 strands, at least about 1,000 strands, at least about 5,000 strands, at least about 50,000 strands, and the like per square millimeter or per cubic millimeter.

In some embodiments, nanofibers or nanofiber mats provided herein have any suitable magnetic coercivity. In some embodiments, provided herein are nanofibers or nanofiber mats having a magnetic coercivity of at least about 10 Oe, at least about 20 Oe, at least about 40 Oe, at least about 60 Oe, at least about 80 Oe, at least about 100 Oe, at least about 125 Oe, at least about 150 Oe, at least about 175 Oe, at least about 200 Oe, at least about 250 Oe, at least about 300 Oe, at least about 350 Oe, at least about 400 Oe, at least about 500 Oe, at least about 1,000 Oe, at most about 10 Oe, at most about 20 Oe, at most about 40 Oe, at most about 60 Oe, at most about 80 Oe, at most about 100 Oe, at most about 125 Oe, at most about 150 Oe, at most about 175 Oe, at most about 200 Oe, at most about 250 Oe, at most about 300 Oe, at most about 350 Oe, at most about 400 Oe, at most about 500 Oe, at most about 1,000 Oe, an between about 50 Oe and 200 Oe, between about 100 Oe and 300 Oe, between about 200 Oe and 500 Oe, between about 300 Oe and 1,000 Oe, between about 10 Oe and 100 Oe, between about 175 Oe and 300 Oe, between about 200 Oe and 250 Oe, or the like. In one aspect, nanofibers and/or nanofiber mats provided herein are paramagnetic or superparamagnetic.

System

In some embodiments, a number of components of a system interact to produce nanofibers. Without limitation, these include an electrospinning apparatus and a module for collecting the electrospun fluid stock or nanofiber. These two components are related by a voltage difference such that the thin jet of fluid stock emanating from the electrospinner is attracted to and deposits on the collection module. In some embodiments, the electrospinning component of the system is a gas-assisted electrospinner. The gas used to accelerate the jet of fluid stock is optionally air.

Figure 5:
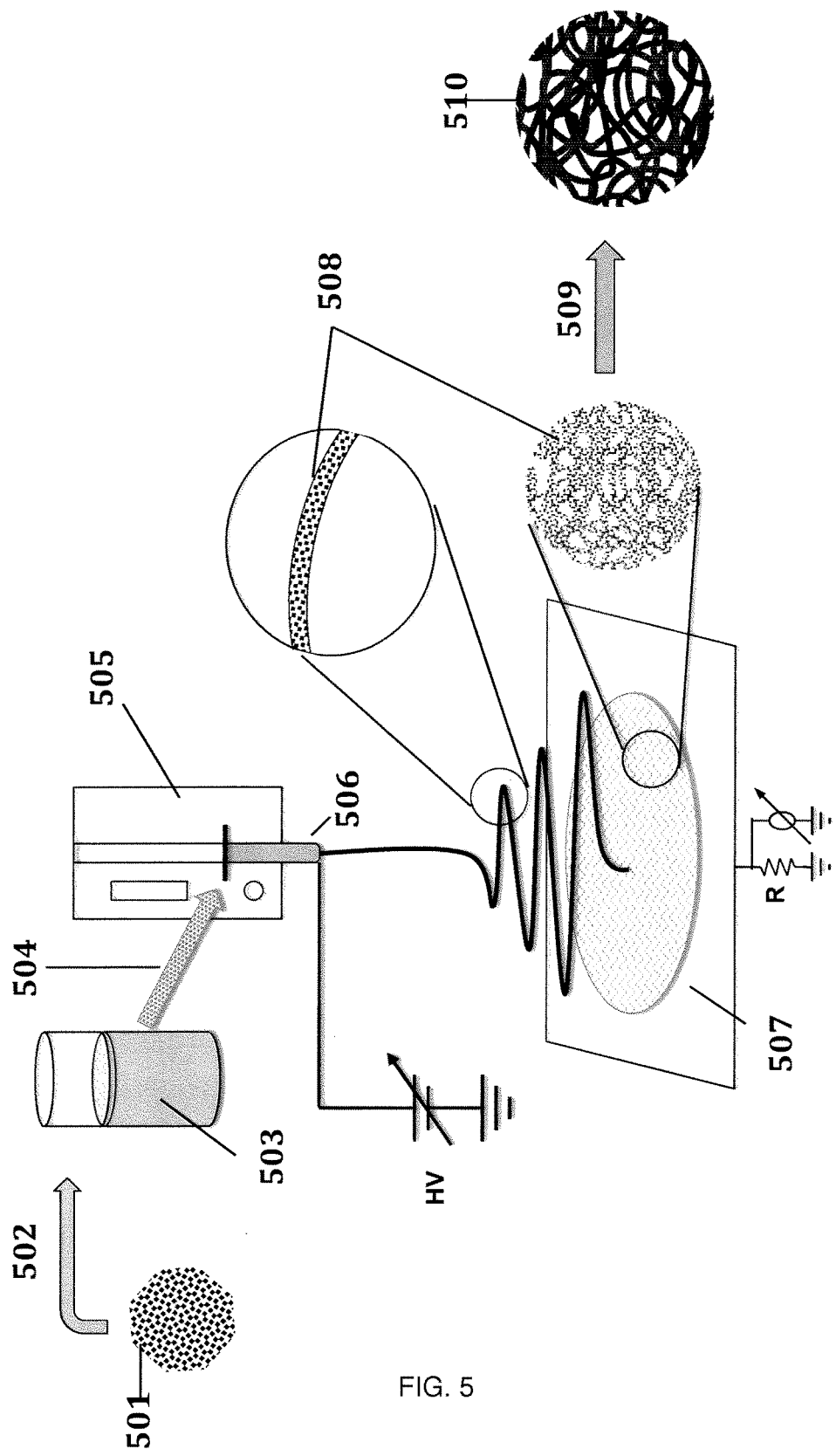
FIG. 5 illustrates a schematic of an apparatus and process for preparing carbonaceous nanofibers described herein.

FIG. 5 illustrates an exemplary schematic of a process described herein. In some instances, a first composition comprising metal reagent component 501 (e.g., metal precursor, such as an acetate of Ag, Al, Co, Fe, Ni, Zn, Zr, Si, etc.) is combined 502 with a second composition comprising a polymer 503 (e.g., PVA, PVAc, PVEO, etc.) to prepare a fluid stock 504 (e.g., comprising a metal reagent component and polymer—unassociated, partially associated, or completely associated with metal reagent component). In some instances, a fluid stock provided herein is electrospun using an electrospinning apparatus, such as a syringe system 505, through a nozzle 506, wherein the nozzle is optionally heated and may optionally comprise a coaxially aligned gas nozzle for expressing gas along the same longitudinal axis as the fluid stock jet (i.e., the precursor nanofiber). In certain embodiments, electrospinning of the fluid stock produces a precursor nanofiber 508, comprising metal precursor and polymer (e.g., in a weight ratio of over 1:2 and up to 4:1), the precursor nanofiber being collected on a collector 507. Treatment 509 (e.g., thermal and/or chemical treatment) of the precursor nanofiber 508 may then be performed (e.g., with a heater and/or in a reaction vessel/chamber) to produce carbonaceous nanofibers 510.

In some embodiments, the system also includes a fluid stock. Among other things, the fluid stock interacts with the electrospinner to produce a nanofiber. In some embodiments, the fluid stock has an elongational viscosity that allows for a jet of fluid stock to erupt from a charged droplet.

In some embodiments, the fluid stock is a system of polymer and precursor that interact with each other to at least in part determine the spinnability of the fluid stock and the properties of the nanofiber.

In some embodiments, the system also includes an apparatus for treating the nanofiber (e.g., a heater or a reaction vessel, such as a gas chamber). In some instances, gas and/or an apparatus for providing gas to the reaction vessel is part of the system, wherein the gas is optionally air, hydrogen, nitrogen, an inert gas, or the like.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The term "alkyl" as used herein, alone or in combination, refers to an optionally substituted straight-chain, or optionally substituted branched-chain saturated or unsaturated hydrocarbon radical. Examples include, but are not limited to methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, n-butyl, isobutyl, sec-butyl, t-butyl, n-pentyl, isopentyl, neopentyl, tert-amyl and hexyl, and longer alkyl groups, such as heptyl, octyl and the like. Whenever it appears herein, a numerical range such as "$C_1$-$C_6$ alkyl," means that: in some embodiments, the alkyl group consists of 1 carbon atom; in some embodiments, 2 carbon atoms; in some embodiments, 3 carbon atoms; in some embodiments, 4 carbon atoms; in some embodiments, 5 carbon atoms; in some embodiments, 6 carbon atoms. The present definition also covers the occurrence of the term "alkyl" where no numerical range is designated. In certain instances, "alkyl" groups described herein include linear and branched alkyl groups, saturated and unsaturated alkyl groups, and cyclic and acyclic alkyl groups.

The term "aryl" as used herein, alone or in combination, refers to an optionally substituted aromatic hydrocarbon radical of six to about twenty ring carbon atoms, and includes fused and non-fused aryl rings. A fused aryl ring radical contains from two to four fused rings, where the ring of attachment is an aryl ring, and the other individual rings are alicyclic, heterocyclic, aromatic, heteroaromatic or any combination thereof. Further, the term aryl includes fused and non-fused rings containing from six to about twelve ring carbon atoms, as well as those containing from six to about ten ring carbon atoms. A non-limiting example of a single ring aryl group includes phenyl; a fused ring aryl group includes naphthyl, phenanthrenyl, anthracenyl, azulenyl; and a non-fused bi-aryl group includes biphenyl.

The term "heteroaryl" as used herein, alone or in combination, refers to optionally substituted aromatic monoradicals containing from about five to about twenty skeletal ring atoms, where one or more of the ring atoms is a heteroatom independently selected from among oxygen, nitrogen, sulfur, phosphorous, silicon, selenium and tin but not limited to these atoms and with the proviso that the ring of the group does not contain two adjacent O or S atoms. Where two or more heteroatoms are present in the ring, in some embodiments, the two or more heteroatoms are the same as each another; in some embodiments, some or all of the two or more heteroatoms are be different from the others. The term heteroaryl includes optionally substituted fused and non-fused heteroaryl radicals having at least one heteroatom. The term heteroaryl also includes fused and non-fused heteroaryls having from five to about twelve skeletal ring atoms, as well as those having from five to about ten skeletal ring atoms. In some embodiments, bonding to a heteroaryl group is via a carbon atom; in some embodiments, via a heteroatom. Thus, as a non-limiting example, an imidiazole group is attached to a parent molecule via any of its carbon atoms (imidazol-2-yl, imidazol-4-yl or imidazol-5-yl), or its nitrogen atoms (imidazol-1-yl or imidazol-3-yl). Further, in some embodiments, a heteroaryl group is substituted via any or all of its carbon atoms, and/or any or all of its heteroatoms. A fused heteroaryl radical contains from two to four fused rings, where the ring of attachment is a heteroaromatic ring. In some embodiments, the other individual rings are alicyclic, heterocyclic, aromatic, heteroaromatic or any combination thereof. A non-limiting example of a single ring heteroaryl group includes pyridyl; fused ring heteroaryl groups include benzimidazolyl, quinolinyl, acridinyl; and a non-fused bi-heteroaryl group includes bipyridinyl. Further examples of heteroaryls include, without limitation, furanyl, thienyl, oxazolyl, acridinyl, phenazinyl, benzimidazolyl, benzofuranyl, benzoxazolyl, benzothiazolyl, benzothiadiazolyl, benzothiophenyl, benzoxadiazolyl, benzotriazolyl, imidazolyl, indolyl, isoxazolyl, isoquinolinyl, indolizinyl, isothiazolyl, isoindolyloxadiazolyl, indazolyl, pyridyl, pyridazyl, pyrimidyl, pyrazinyl, pyrrolyl, pyrazinyl, pyrazolyl, purinyl, phthalazinyl, pteridinyl, quinolinyl, quinazolinyl, quinoxalinyl, triazolyl, tetrazolyl, thiazolyl, triazinyl, thiadiazolyl and the like, and their oxides, such as for example pyridyl-N-oxide.

The term "heteroalkyl" as used herein refers to optionally substituted alkyl structure, as described above, in which one or more of the skeletal chain carbon atoms (and any associated hydrogen atoms, as appropriate) are each independently replaced with a heteroatom (i.e. an atom other than carbon, such as though not limited to oxygen, nitrogen, sulfur, silicon, phosphorous, tin or combinations thereof), or heteroatomic group such as though not limited to —O—O—, —S—S—, —O—S—, —S—O—, =N—N=, —N=N—, —N=N—NH—, —P(O)2-, —O—P(O)2-, —P(O)2-O—, —S(O)—, —S(O)2-, —SnH2- and the like.

The term "heterocyclyl" as used herein, alone or in combination, refers collectively to heteroalicyclyl groups. Herein, whenever the number of carbon atoms in a heterocycle is indicated (e.g., C1-C6 heterocycle), at least one non-carbon atom (the heteroatom) must be present in the ring. Designations such as "C1-C6 heterocycle" refer only to the number of carbon atoms in the ring and do not refer to the total number of atoms in the ring. Designations such as "4-6 membered heterocycle" refer to the total number of atoms that are contained in the ring (i.e., a four, five, or six membered ring, in which at least one atom is a carbon atom, at least one atom is a heteroatom and the remaining two to four atoms are either carbon atoms or heteroatoms). For heterocycles having two or more heteroatoms, in some embodiments, those two or more heteroatoms are the same; in some embodiments, they are different from one another. In some embodiments, heterocycles are substituted. Non-aromatic heterocyclic groups include groups having only three atoms in the ring, while aromatic heterocyclic groups must have at least five atoms in the ring. In some embodiments, bonding (i.e. attachment to a parent molecule or further substitution) to a heterocycle is via a heteroatom; in some embodiments, via a carbon atom.

EXAMPLES

Example 1—Preparing a Fluid Stock of Nickel Acetate and PVA

Two (2) grams of nickel acetate, the metal precursor, was dissolved in 20 ml of 1 molar acetic acid solution. The solution was stirred for 2 hours to create a solution of nickel acetate. The solution was homogenous.

In a second solution, 1 gram of 99.7% hydrolyzed polyvinyl alcohol (PVA) with an average molecular weight of 79 kDa and polydispersity index of 1.5 was dissolved in 10 ml of de-ionized water. The polymer solution was heated to a temperature of 95° C. and stirred for 2 hours to create a homogenous solution.

The nickel acetate solution was then combined with the PVA solution to create a fluid stock. In order to distribute the precursor substantially evenly in the fluid stock, the precursor solution was added gradually to the polymer solution while being continuously vigorously stirred for 2 hours. The mass ratio of precursor to polymer for the fluid feed (based on initial nickel acetate mass) was 2:1.

Example 2—Characterization of a Fluid Stock of Nickel Acetate and PVA

The chemical interaction between the ligand of the metal precursor and the functional group in the polymer backbone resulted in extremely high loading of metal precursors without losing the spinnability. The interaction was demonstrated in the FT-IR study for nanofibers with various ratios of PVA to Ni precursor. As demonstrated in FIG. 4, the reduction of —OH bond and increase in—CO bond were observed at high loading of Ni precursor (Ni:PVA=4:1).

Example 3—Electrospinning a Fluid Stock of Nickel Acetate and PVA

Figure 6:
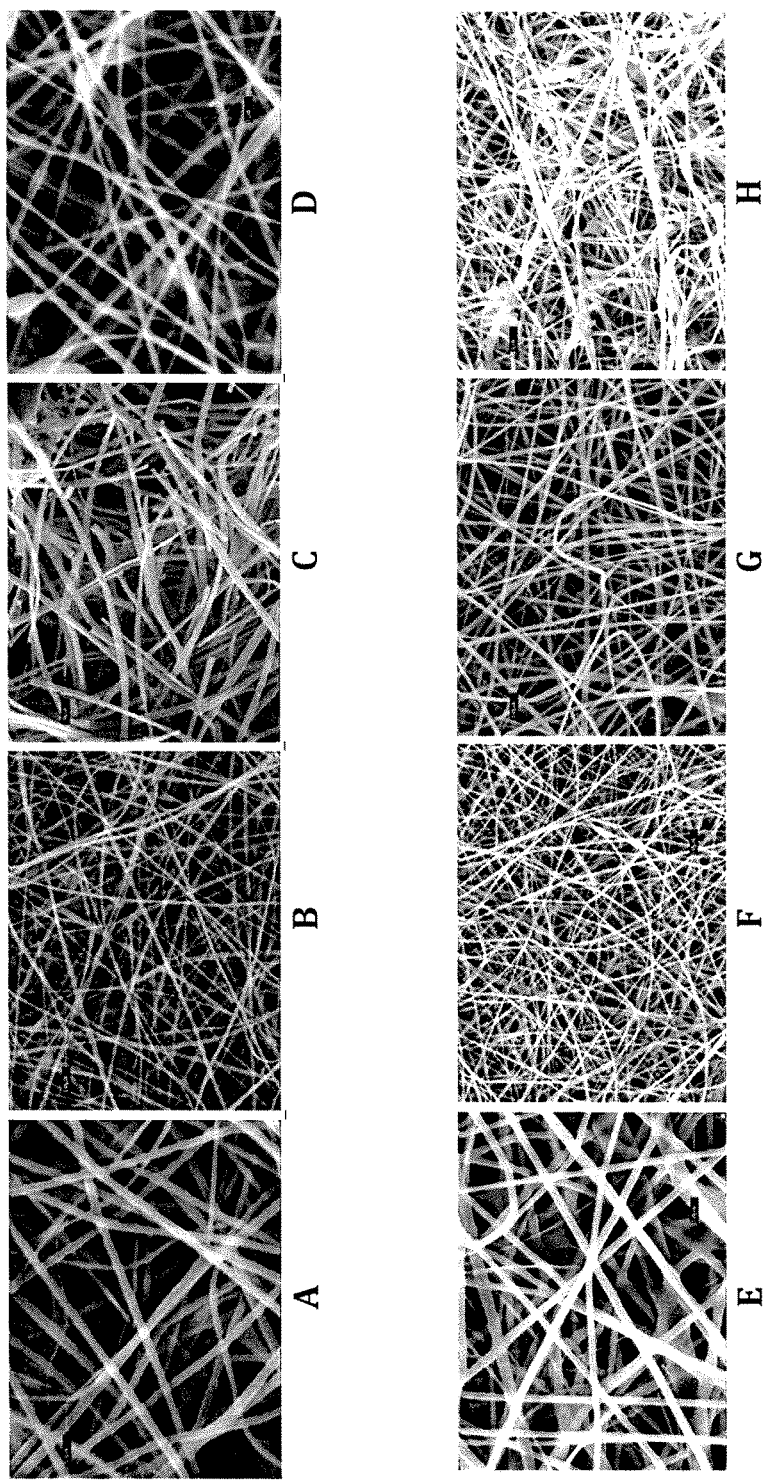
FIG. 6 illustrates various precursor nanofibers prepared according to processes described herein.

The fluid stock of Example 1 was electrospun by a gas-assisted technique. The overall process and apparatus is depicted in FIG. 5. The fluid stock was loaded into a syringe pump connected to a spinneret with an inner nozzle diameter (fluid stock) of $4.13 \times 10^{-4}$ m and an outer (air) diameter of $1.194 \times 10^{-3}$ m. The distance between the nozzle and the collection plate was kept at about 15 cm and the fluid stock was spun at a rate of 0.1 ml/min. A charge of +15 kV was maintained at the collector. The air velocity at the nozzle was 100 m/s. The temperature of the air and fluid stock at the nozzle was 300 K. FIG. 6, Panel A illustrates such electrospun nanofibers.

Example 4—Copper Acetate and PVA Fluid Stock and Nanofiber

Following the procedure of Example 1, a fluid stock of copper acetate and PVA were prepared with ratios of precursor:polymer of 2:1. These fluid stocks were electrospun by the procedure of Example 3. FIG. 6, Panel B illustrates such electrospun nanofibers, having a diameter of approximately 600-800 nm as spun.

Example 5—Silver Acetate and PVA Fluid Stock and Nanofiber

Following the procedure of Example 1, a fluid stock of silver acetate and PVA were prepared with ratios of precursor:polymer of 2:1. These fluid stocks were electrospun by the procedure of Example 3. FIG. 6, Panel C illustrates such electrospun nanofibers, having a diameter of approximately 900-1200 nm as spun.

Example 6—Iron Acetate and PVA Fluid Stock and Nanofiber

Following the procedure of Example 1, a fluid stock of iron acetate and PVA were prepared with ratios of precursor:polymer of 2:1. These fluid stocks were electrospun by the procedure of Example 3. FIG. 6, Panel D illustrates such electrospun nanofibers, having a diameter of approximately 300-500 nm as spun.

Example 7—Zinc Acetate and PVA Fluid Stock and Nanofiber

Following the procedure of Example 1, a fluid stock of zinc acetate and PVA were prepared with ratios of precursor:polymer of 2:1. These fluid stocks were electrospun by the procedure of Example 3. FIG. 6, Panel E illustrates such electrospun nanofibers, having a diameter of approximately 500-1000 nm as spun.

Example 8—Cadmium Acetate and PVA Fluid Stock and Nanofiber

Following the procedure of Example 1, a fluid stock of cadmium acetate and PVA were prepared with ratios of precursor:polymer of 2:1. These fluid stocks were electrospun by the procedure of Example 3. FIG. 6, Panel F illustrates such electrospun nanofibers, having a diameter of approximately 800-1200 nm as spun.

Example 9—Zirconium Acetate and PVA Fluid Stock and Nanofiber

Following the procedure of Example 1, a fluid stock of zirconium acetate and PVA were prepared with ratios of precursor:polymer of 2:1. These fluid stocks were electrospun by the procedure of Example 3. FIG. 6, Panel G illustrates such electrospun nanofibers, having a diameter of approximately 800-1000 nm as spun.

Example 10—Lead Acetate and PVA Fluid Stock and Nanofiber

Following the procedure of Example 1, a fluid stock of lead acetate and PVA were prepared with ratios of precursor:polymer of 2:1. These fluid stocks were electrospun by the procedure of Example 3. FIG. 6, Panel H illustrates such electrospun nanofibers, having a diameter of approximately 500-1200 nm as spun.

Example 11—Lead Acetate, Selenium Powder and PVA Fluid Stock and Nanofiber

A mixture of 50/50 lead acetate and Se powder was prepared according to the procedures of Example 1. The precursors were further made into a fluid stock with PVA according to the procedure of Example 1 and electrospun according to the procedure of Example 3 to produce nanofibers, having a diameter of approximately 700-1300 nm as spun.

Example 12—Fluid Feeds and Nanofibers

Figure 7:
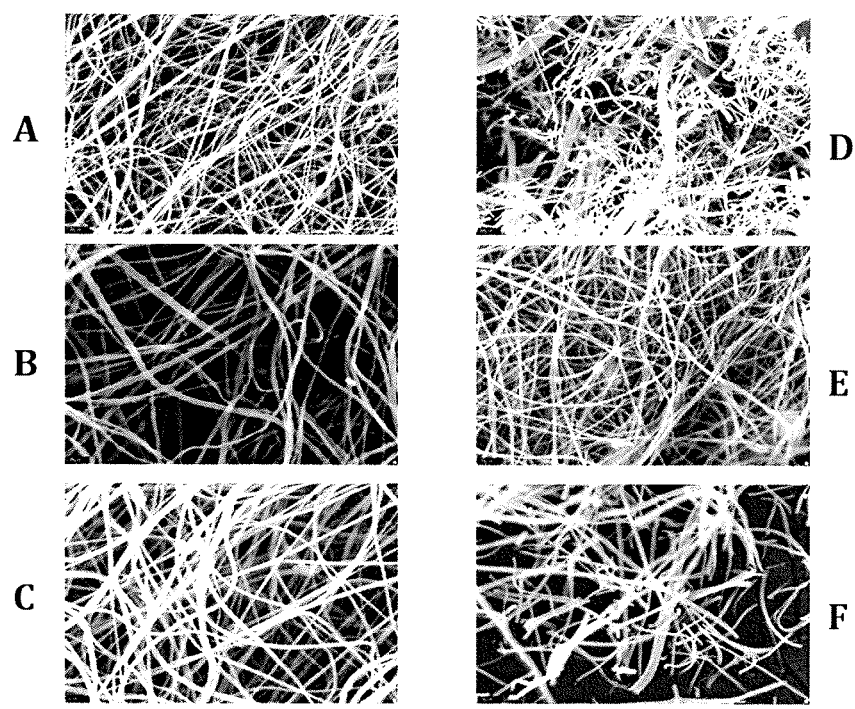
FIG. 7 illustrates various precursor nanofibers and carbonaceous nanofibers described herein and prepared according to processes described herein.

Following procedures similar to Example 1, fluid stocks were prepared by combining silicon acetate and PVA, iron acetate and PVA, and titanium dioxide nanoparticles and PVA. These fluid stocks were electrospun to produce nanofibers depicted in FIG. 7, Panels A, B, and C, respectively.

Additionally, following the procedure of Example 1, fluid stocks are prepared according to Table 2 in the identified precursor-to-polymer load ratio (based on initial precursor mass combined with the polymer). These fluid stocks are also electrospun according to the procedure of Example 3.

TABLE 2

| reagent | polymer | load ratio |
|---|---|---|
| iron nitrate | PVA | 1:1 |
| iron chloride (+carbon powder) | PVA | 2:1 |
| iron acetate chromium acetate | PVE | 1:1 (89/11) |
| zirconium chloride | PVA | 2:1 |
| nickel bromide | PEO | 1:1 |
| chromium methoxide | PVE | 1.5:1 |
| tungsten ethoxide | PVA | 3:1 |
| CdClOH | polyvinyl pyridine | 1:1 |
| silver acetate | PEO | 1:1 |
| nickel nitrate | polyacrylic acid | 2:1 |
| copper ethoxide | PVA | 1:1 |
| nickel chloride | PVE | 3:1 |
| zirconium nitrate | polyvinyl pyridine | 1:1 |
| copper nitrate | PVE | 3.5:1 |
| nickel t-butoxide | PVO | 1:1 |
| copper chloride | polyacrylic acid | 1.5:1 |
| aluminum nitrate zirconium acetate | PVE | 2:1 (70/30) |

Example 13—Metal Carbide Nanofibers from Precursor

To produce metal carbide nanofibers, the electrospun precursor nanofibers of Examples 3-12 are heated at a rate of 1-35° C. to a temperature of 1000-1700° C. and held there for 10 min to 20 hours. For example, treatment of nanofibers produced by electrospinning fluid stocks prepared by combining silicon acetate and PVA, and iron acetate and PVA, were utilized to produce silicon carbide nanofibers, and iron carbide nanofibers. These metal carbide nanofibers are illustrates in FIG. 7, Panels D, and E, respectively. Single nanofibers and x-ray crystal diffraction patterns for such nanofibers are illustrated in FIG. 8, Panels A, and B, respectively.

FIG. 14 illustrates improved Young's modulus and electrical conductivity of metal carbide (silicon carbide) nanofibers compared to bulk powder properties. These properties were measured using the AFM (Atomic Force Microscope) on an individual nanofiber after sputter coating.

FIG. 15 illustrates electrical and thermal conductivities of metal carbide (silicon carbide) nanofibers at various fiber diameters. Electrical conductivities are measured using the AFM (Atomic Force Microscope) on an individual nanofiber after sputter coating. Thermal conductivities are measured with the SThM Tip Probe dragging across surface of the conductive area. Heat was applied to the nanofiber surface bias and resulting thermal properties throughout nanofiber suspended across trench was measured.

Example 14—Carbon/Metal Composite Nanofibers, with a Continuous Carbon Matrix from Metal Precursor To produce metal composite nanofibers with a carbon matrix, the electrospun precursor nanofibers of Examples 3-12 are heated under argon at a rate of 1-35° C. to a temperature of 400-1200° C. and held there for 10 min to 20 hours.

Example 15—Nanoparticle-Based Fluid Stock 0.5 grams of preformed nanoparticles (100 nm average diameter), is suspended in 20 ml of 1 molar acetic acid solution with X-100 surfactant. The solution is stirred for 2 hours to create a suspension of nanoparticles.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The nanoparticle suspension is then combined with the PVA solution to create a fluid stock. In order to distribute the nanoparticles substantially evenly in the fluid stock, the nanoparticle suspension is added gradually to the polymer solution while being continuously vigorously stirred for 2 hours. The mass ratio of nanoparticles to polymer for the fluid feed (based on nanoparticle mass) is 1:4 (alternatively, other ratios, such as 3:1 or 2:1 or 1:1 or 1:2 or 1:3 are optionally utilized).

Figure 11:
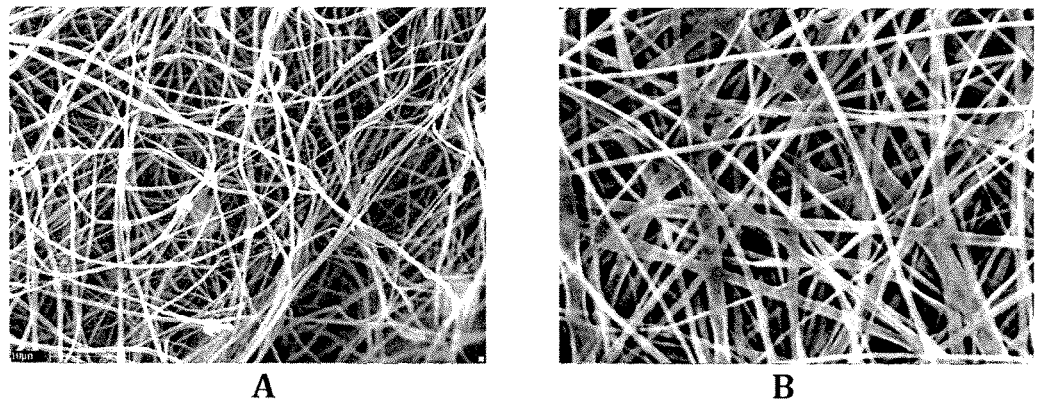
FIG. 11 illustrates an SEM image of a nanofiber prepared by gas-assisted electrospinning of a fluid stock comprising polymer and nanoparticles and comprising nanoparticles embedded in a polymer matrix (Panel A); and an SEM image of a nanofiber prepared by calcining a precursor nanofiber (e.g., of Panel A) and comprising nanoparticles embedded in a carbon matrix (Panel B).

The fluid stock is electrospun by a gas-assisted technique. The overall process and apparatus is depicted in FIG. 5. The fluid stock is loaded into a syringe pump connected to a spinneret with an inner nozzle diameter (fluid stock) of $4.13 \times 10^{-4}$ m and an outer (air) diameter of $1.194 \times 10^{-3}$ m, thereby providing a precursor nanofiber. FIG. 11 (Panel A) illustrates an SEM image of a precursor nanofiber comprising (non-aggregated) nanoparticles embedded within a polymer matrix. The distance between the nozzle and the collection plate is kept at about 15 cm and the fluid stock is spun at a rate of 0.01 mL/min. A charge of +20 kV is maintained at the collector. The air velocity at the nozzle is 100 m/s. The temperature of the air and fluid stock at the nozzle is 300 K.

Example 16—Nanoparticle Based Organic Fluid Stock

Fluid stock: is prepared similar to as set forth in Example 15, using polyacrylonitrile (PAN) as the polymer and dimethylformamide (DMF) as the solvent. Polyacrylonitrile (PAN) is combined with DMF. Nanoparticles are added to the polymer solution, mixed and heated.

Nanofibers: the fluid stock is gas-assisted electrospun from a needle apparatus having an inner needle and an outer needle coaxially aligned, the inner needle providing the fluid stock, the outer needle providing the gas. The fluid stock is provided at a flow rate of 0.01 mL/min; the voltage used is 20 kV, the needle apparatus tip to collector distance is 15 cm.

Example 17—Metal Carbide Nanofibers from Metal/Metal Oxide Nanoparticles

To produce metal carbide nanofibers, the precursor nanofibers of Example 15 or 16 are heated at a rate of 1-35° C.

to a temperature of 1000-1700° C. and held there for 10 min to 20 hours. For example, treatment of nanofibers produced by electrospinning fluid stocks prepared by combining titanium dioxide nanoparticles and PVA, were utilized to produce titanium carbide nanofibers. These metal carbide nanofibers are illustrates in FIG. 7, Panel F. Single nanofibers and x-ray crystal diffraction patterns for such nanofibers are illustrated in FIG. 8, Panel C.

Figure 13:
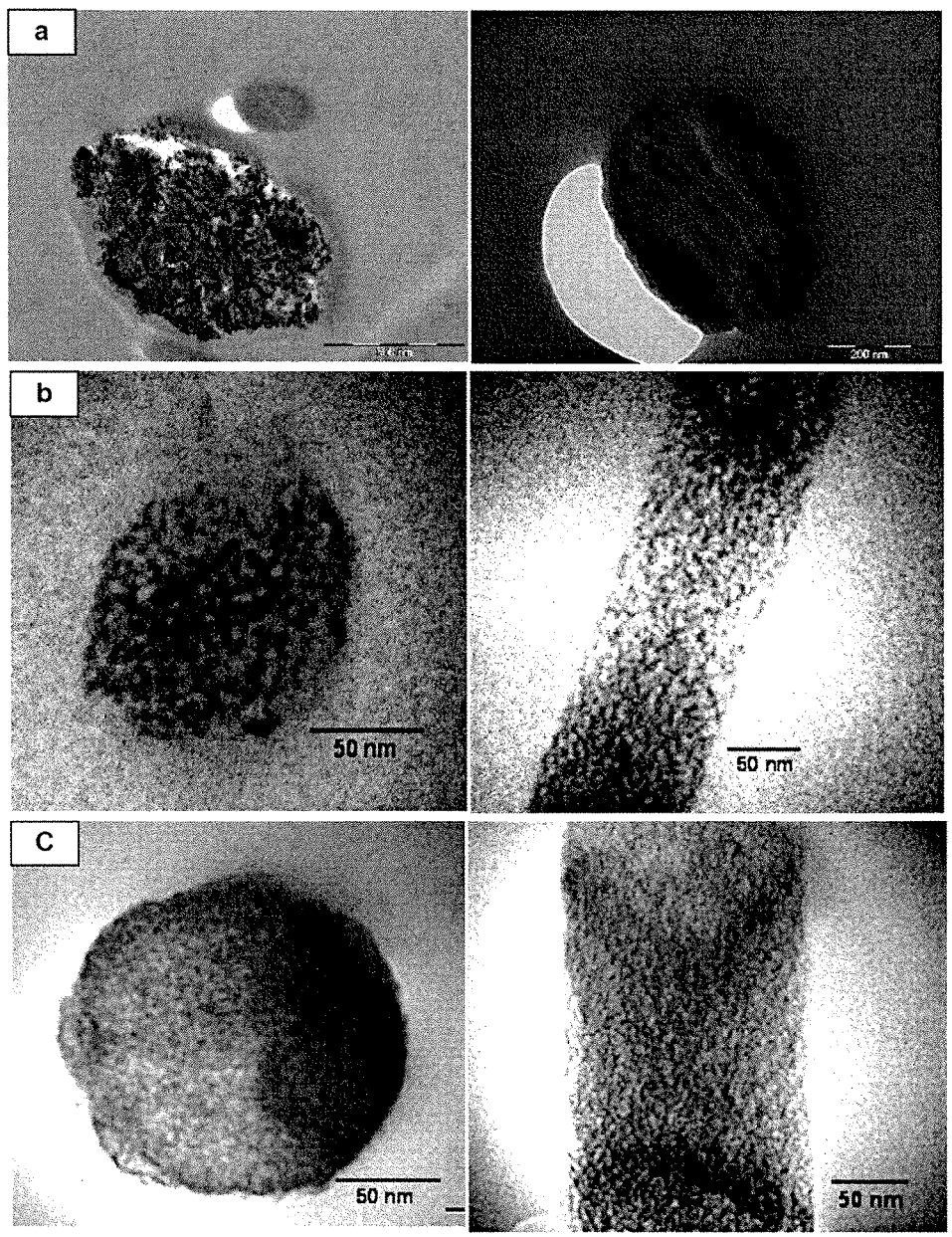
FIG. 13 illustrates TEM images of microtomed nanofibers. Panel (a) illustrates a TEM image of a nanofiber comprising a polymer matrix with $TiO_2$ nanoparticles (5-10 nm in diameter) embedded therein. Panel (b) illustrates a TEM image of a nanofiber comprising a continuous TiC matrix prepared from the nanofiber of panel (a)—treated at 1200 C. Panel (c) illustrates a TEM image of a nanofiber comprising a continuous TiC matrix prepared from the nanofiber of panel (a)—treated at 1400 C. Images on the right are radial cross-sections, while those on the right are longitudinal sections along the fiber axis.

Further, FIG. 13. illustrates TEM images of microtomed a) as-spun $TiO_2$ (5-10 nm in diameter)-polymer nanofibers, and TiC nanofibers after carbothermal reduction b) at 1200° C., and c) at 1400° C. Images in the left are radial cross-sections, while those in the right (b, c) are longitudinal sections along the fiber axis.

Example 18—Carbon/Metal Composite Nanofibers, with Continuous Carbon Matrix from Nanoparticles To produce metal composite nanofibers with (e.g., with discrete domains of metal, ceramic, or metal oxide nanoparticles embedded within) a carbon matrix, the precursor nanofibers of Example 15 or 16 are heated under argon at a rate of 1-35° C. to a temperature of 400-1200° C. and held there for 10 min to 20 hours.

Figure 12:
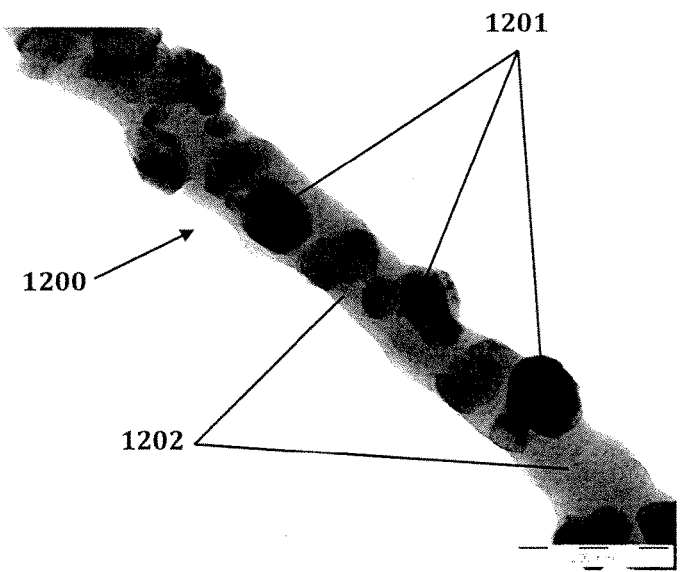
FIG. 12 illustrates a TEM image of a nanofiber prepared by calcining a precursor nanofiber (e.g., comprising nanoparticles embedded within a polymer matrix) and comprising nanoparticles embedded in a carbon matrix. As illustrated in the image, the nanoparticles are non-aggregated within the carbon matrix.

FIG. 11 (Panel B) illustrates an SEM image of a composite nanofiber comprising nanoparticle embedded within a carbon matrix. FIG. 12 illustrates a TEM image of a composite nanofiber comprising nanoparticle embedded within a carbon matrix. As seen in the image, the nanoparticles 1201 are evenly dispersed and non-aggregated in the carbon matrix 1202 of the nanofiber 1200.

What is claimed is:

1. A process of producing one or more carbonaceous nanofiber, the process comprising
   a. combining a metal reagent component with a polymer to provide a fluid stock, the fluid stock comprising at least one weight part metal reagent component for every one weight part polymer, the metal reagent component being present in the fluid stock in a concentration of at least 60 mM, and the metal reagent component comprising a plurality of nanoparticles;
   b. electrospinning the fluid stock to produce an electrospun material, wherein electrospinning of the fluid stock is gas assisted; and
   c. thermally treating the electrospun material to produce a carbonaceous nanofiber.

2. The process of claim 1, wherein the carbonaceous nanofiber is a metal carbide nanofiber.

3. The process of claim 1, wherein the carbonaceous nanofiber is a nanofiber comprising (i) a metal component; and (ii) a continuous matrix of carbon.

4. The process of claim 2, wherein thermally treating the electrospun material comprises heating the electrospun material to a temperature of at least 1000° C.

5. The process of claim 3, wherein thermally treating the electrospun material comprises heating the electrospun material to a temperature of between 400° C. and 1200° C. under inert or reductive conditions.

6. The process of claim 1, wherein the nanoparticles comprise a plurality of metal nanoparticles, a metal oxide nanoparticles, or a combination thereof.

7. The process of claim 1, wherein the metal of the metal component is selected from the group consisting of: Ag, Cu, Ni, Fe, Co, Pb, Au, Sn, Al, Zr, Mn, Be, Cd, Si, Ti, V, Hf, Sr, Ba, Ge, and combinations thereof.

8. The process of claim 1, wherein the polymer is polyvinyl alcohol (PVA), polyvinyl acetate (PVAc), polyethylene oxide (PEO), polyvinyl ether, polyvinyl pyrrolidone, polyglycolic acid, hydroxyethylcellulose (HEC), ethylcellulose, cellulose ethers, polyacrylic acid, polyisocyanate, or a combination thereof.

9. The process of claim 3, wherein the metal component comprises metal, and the nanofibers comprise isolated domains of metal component embedded within the carbon matrix.

10. The process of claim 3, wherein the nanofibers comprise at least 90 elemental wt. % of metal and carbon, when taken together.

11. The process of claim 1, wherein the nanofibers have an average length of at least 50 μm long, have an aspect ratio of at least 1000, or both.

12. The process of claim 1, wherein the gas assisted electrospinning is coaxial gas assisted electrospinning.

13. The process of claim 1, wherein the nanoparticles comprise titanium dioxide.

14. The process of claim 1, wherein the nanoparticles have an average diameter of about 1 to about 100 nm.

15. The process of claim 1, wherein the concentration of metal reagent in the fluid stock is at least 100 mM.

16. The process of claim 15, wherein the concentration of metal reagent in the fluid stock is at least 200 mM.

17. The process of claim 1, wherein the fluid stock comprising at least two weight parts metal reagent component for every one weight part polymer.

* * * * *